(12) United States Patent
Tharrett et al.

(10) Patent No.: US 11,528,973 B1
(45) Date of Patent: Dec. 20, 2022

(54) CASES FOR ELECTRONIC DEVICES

(71) Applicant: Bose Corporation, Framingham, MA (US)

(72) Inventors: Dallas Robert Tharrett, Norfolk, MA (US); Donna Marie Sullivan, Millbury, MA (US); Mark James Joseph McCauley, Brighton, MA (US); Christopher Glenn Donaldson, South Grafton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 17/465,123

(22) Filed: Sep. 2, 2021

(51) Int. Cl.
| | |
|---|---|
| *A45C 11/00* | (2006.01) |
| *H02J 7/00* | (2006.01) |
| *A45C 13/00* | (2006.01) |
| *H04R 1/10* | (2006.01) |
| *H04R 1/02* | (2006.01) |
| *H02J 50/10* | (2016.01) |

(52) U.S. Cl.
CPC ............ *A45C 11/00* (2013.01); *A45C 13/005* (2013.01); *H02J 7/0044* (2013.01); *H04R 1/02* (2013.01); *H04R 1/1025* (2013.01); *A45C 2011/001* (2013.01); *H02J 50/10* (2016.02)

(58) Field of Classification Search
CPC . A45C 11/00; A45C 13/005; A45C 2011/001; H02J 7/0044; H02J 50/10; H04R 1/02; H04R 1/025

USPC .................................................. 206/37, 320
See application file for complete search history.

(56) References Cited

U.S. PATENT DOCUMENTS

| | | | |
|---|---|---|---|
| 10,212,506 B2 | 2/2019 | Panecki et al. | |
| 2015/0245126 A1* | 8/2015 | Shaffer | H04R 1/1025 |
| | | | 381/74 |
| 2017/0013875 A1* | 1/2017 | Schennum | A24F 40/95 |
| 2021/0058687 A1* | 2/2021 | Liu | H04R 1/1025 |
| 2021/0345742 A1* | 11/2021 | Wright | A45F 5/021 |
| 2022/0183434 A1* | 6/2022 | Tsai | A45C 15/00 |
| 2022/0192335 A1* | 6/2022 | Maguire | A45C 13/1069 |
| 2022/0218081 A1* | 7/2022 | Hofstrand | H04R 1/1025 |

* cited by examiner

*Primary Examiner* — Jacob K Ackun

(57) ABSTRACT

A case for an electronic device. The case includes a lower housing having a cavity to receive the electronic device, and an electrical connector configured to couple to the electronic device. A lid is attached to the lower housing with a pivotable joint allowing the lid to rotate between a closed position where the lid is aligned over the cavity and an open position where the lid is angularly displaced allowing the electronic device to be removed from the cavity. The case also includes a hinge that provides the pivotable joint. The hinge is configured such that, when the lid is in the closed position, it is biased to remain closed via a detent, and, such that the lid has one or more stable positions between the fully open and fully closed positions.

20 Claims, 21 Drawing Sheets

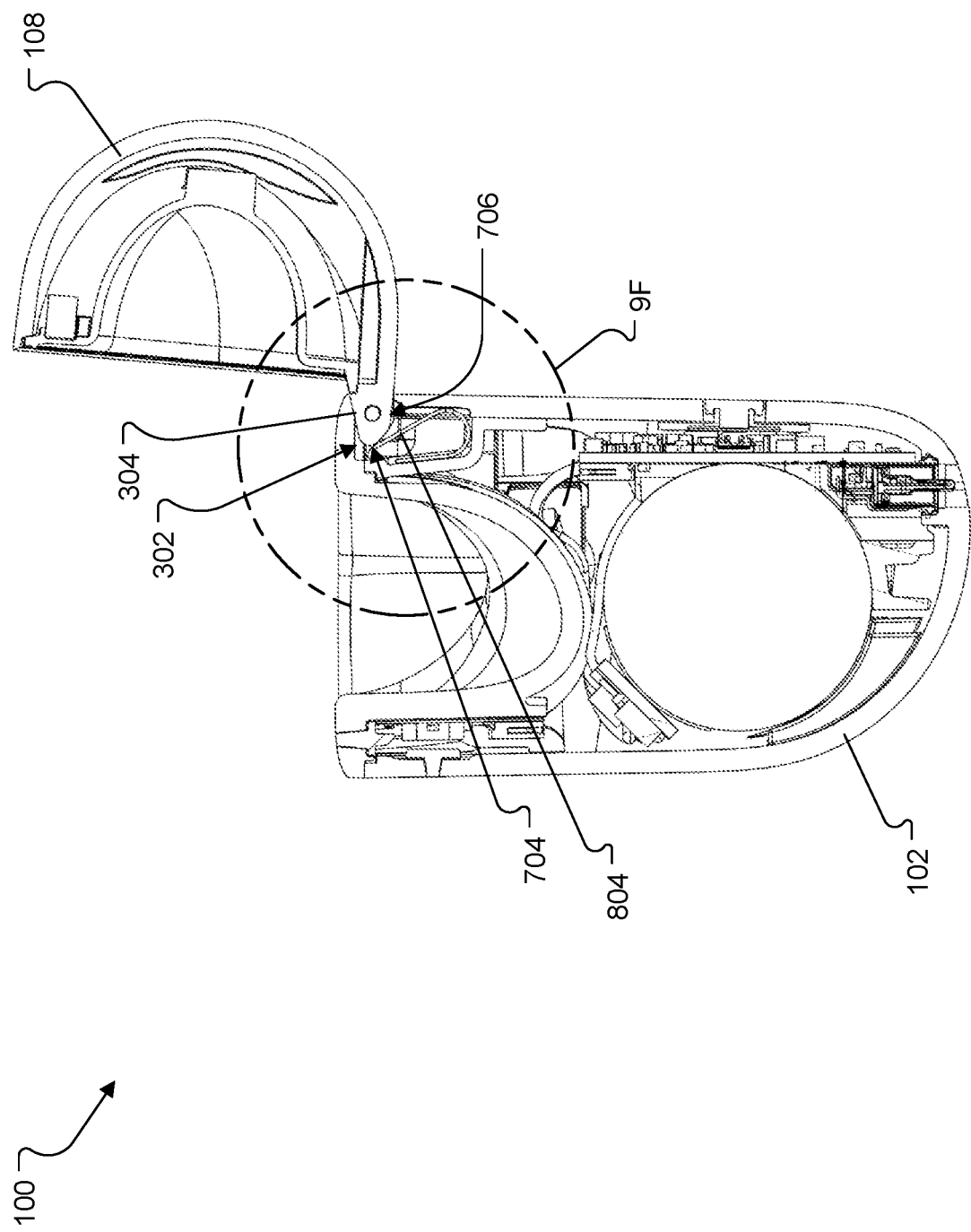

CASES FOR ELECTRONIC DEVICES

BACKGROUND

This disclosure relates to cases, e.g., charging case, for electronic devices, such as earbuds.

Various charging cases for earbuds are known. These charging cases generally consist of a housing that includes one or more cavities for receiving the earbuds and a lid that is pivotably coupled to the housing and is displaceable from an open position in the one or more cavities are uncovered, to allow the earbuds to be inserted or removed, and a closed position in the cavities are covered.

In one example, a prior art charging case includes a lid that is pivotably coupled to a housing via a hinge that includes a torsion spring that is coaxially arranged with a pivot pin. The spring biases the lid toward an open position. The lid is maintained closed by a latch that is arranged along an edge of the case that is opposite the hinge. The latch can be disengaged by a button, thereby causing the lid to swing open under a force provided by the spring. One problem with this configuration is that the latch and button take up space leading to a larger overall size of the case. This can result in a case design that is too large to fit comfortably in a user's pocket. Furthermore, the inclusion of the latch and button adds to the list of parts that can break or malfunction.

Still, other prior art charging cases are known which do away with the need for a separate latch and button. For example, U.S. Pat. No. 10,212,506 describes a charging case with a lid that is coupled to a housing via a bi-stable hinge. A plurality of magnets is disposed within the housing and the lid. The magnets are configured to create an over-center configuration for the lid where the lid pivots between a first stable position when in the closed position and a second stable position when in the open position but is in an unstable position in-between the closed position and the open position.

U.S. Pat. No. 10,397,683 describes a charging case for a pair of earbuds with another type of bi-stable hinge that includes an over-center mechanism for the lid including an extension that is attached to the lid and is disposed on an opposite side of a pivotable joint from the lid. The extension is in contact with an arm that resists the lid rotating from the open position to the closed position until the lid is moved past an over-center position when the lid is then impelled to the closed position, and the arm resists the lid rotating from the closed position to the open position until the lid is moved past the over-center position when the lid is then impelled to the open position.

While these bi-stable hinge configurations eliminate the need for a latch to keep the lid closed, they are not without their own drawbacks. In that regard, in all of the above-mentioned configurations, the biasing/impelling of the lid to the open position can be jarring to some users. The force from that motion can cause a user to drop the case and/or in some instances the force impelling the lid open can cause the earbuds to be ejected from the case, which can lead to loss of or damage to the earbuds.

SUMMARY

All examples and features mentioned below can be combined in any technically possible way.

In one aspect, a case for an electronic device. The case includes a lower housing having a cavity to receive the electronic device, and an electrical connector configured to couple to the electronic device. A lid is attached to the lower housing with a pivotable joint allowing the lid to rotate between a fully closed position where the lid is aligned over the cavity and a fully open position where the lid is angularly displaced allowing the electronic device to be removed from the cavity. The case also includes a hinge that provides the pivotable joint. The hinge is configured such that, when the lid is in the closed position, it is biased to remain closed via a detent, and, such that the lid has one or more stable positions between the fully open and fully closed positions.

Implementations may include one of the following features, or any combination thereof.

In some examples, the hinge is configured such that regardless of its orientation relative to the lower housing, the lid is not impelled toward the fully open position.

implementations, the hinge includes an extension member and a biasing member that engages the extension member to provide the detent.

In certain implementations, the extension member includes a cam.

In some cases, the cam includes a flat and a curve and, when the lid is in the fully closed position, the biasing member engages the flat to provide the detent.

In certain cases, when the lid is in the open position, the biasing member engages the curve.

In some examples, when the lid is in a plurality of stable positions between the fully closed position and the fully open position, the biasing member engages the curve.

In certain examples, in each of the plurality of stable positions between the fully closed position and the fully open position, friction between the cam and the biasing member holds the lid stable relative to the lower housing.

In some implementations, the biasing member includes a spring.

In certain implementations, the spring is a double torsion spring.

In some examples, the spring is a flat spring.

In some cases, the spring is coated with a lubricant to prevent wear on the cam.

In certain cases, the biasing member engages the extension member to provide an infinite number of stable positions of the lid relative to the lower housing between the fully closed position and the fully open position.

In some examples, the biasing member is supported in the lower housing and the extension is defined by the lid.

In certain examples, the lower housing includes a lower housing body and a hinge cover that together define a pocket for supporting the biasing member.

In some implementations, the hinge cover includes a lip along its inner surface and the lip inhibits the spring from moving out of the pocket.

In certain implementations, the lower housing includes an inner tray that defines the cavity and covers the pocket.

In some cases, the case includes a hinge pin that extends through the extension member. The hinge pin is received in the pocket and the inner tray covers exposed ends of the hinge pin such that the lid is pivotably coupled to the lower housing.

In certain cases, when the lid is in the fully open position, there is an interference between the lower housing and the lid that provides a mechanical hard stop to inhibit further movement of the lid relative to the lower housing.

In some examples, the lid includes a lid body and an upper cover that covers an open end of the lid body and defines an upper cavity that is complimentary to an upper surface of the electronic device.

BRIEF DESCRIPTION OF THE DRAWINGS

FIG. 9E is a cross-sectional side view of the charging case of FIG. 1A, using the flat spring of FIG. 8, shown in a fully open position.

Commonly labeled components in the FIGURES are considered to be substantially equivalent components for the purposes of illustration, and redundant discussion of those components is omitted for clarity. Numerical ranges and values described according to various implementations are merely examples of such ranges and values and are not intended to be limiting of those implementations. In some cases, the term "about" is used to modify values, and in these cases, can refer to that value +/−a margin of error, such as a measurement error, which may range from up to 1-5 percent.

DETAILED DESCRIPTION

This disclosure relates to a charging case for a pair of earbuds that includes a lid which is pivotably attached to a lower housing that receives the earbuds. Notably, the lid is biased closed, to avoid the need for a latch, but, regardless of its orientation relative to the lower housing, is not biased open.

Figure 1A:
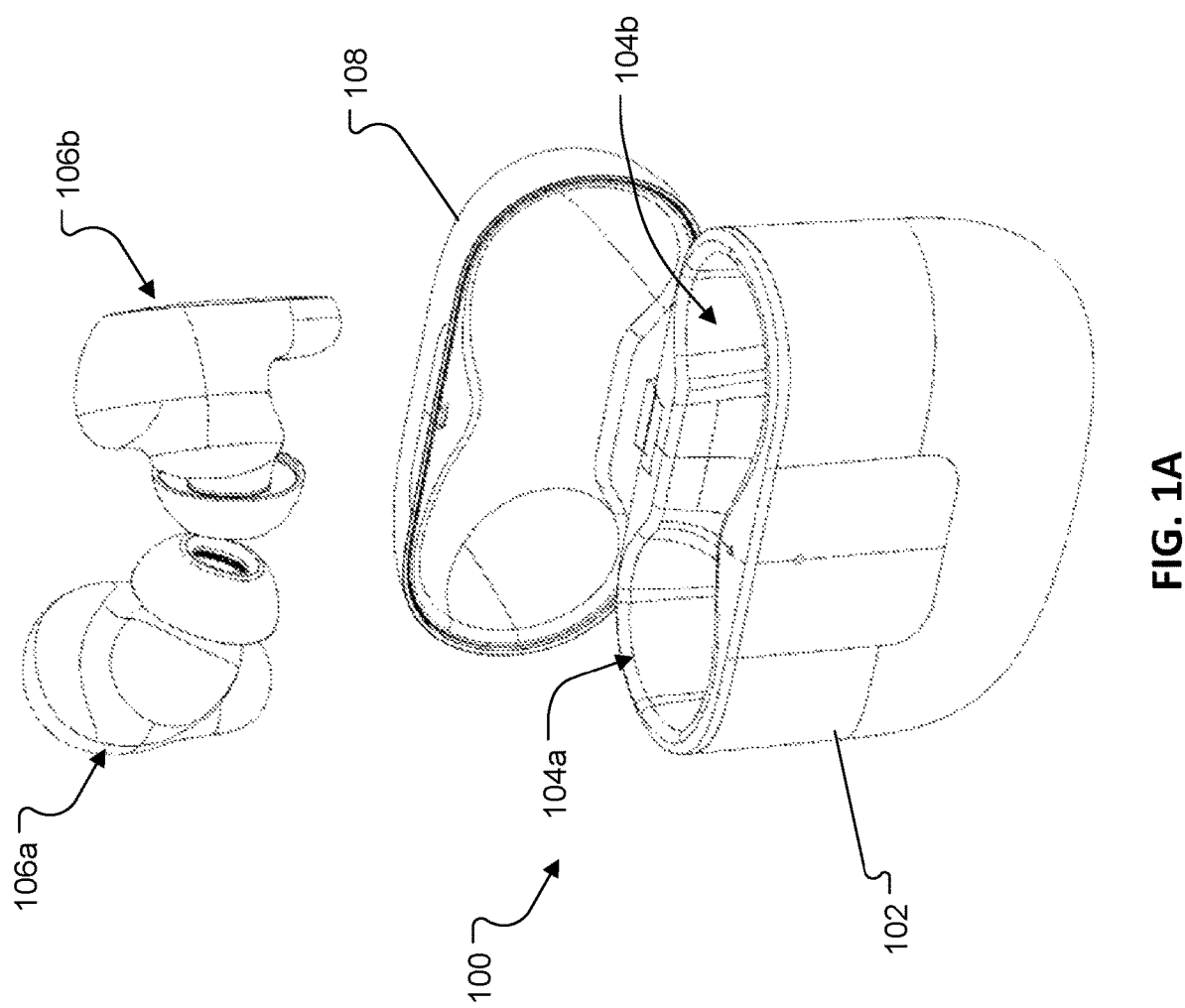
FIGS. 1A and 1B are front perspective views of a charging case and earbuds.
Figure 1B:
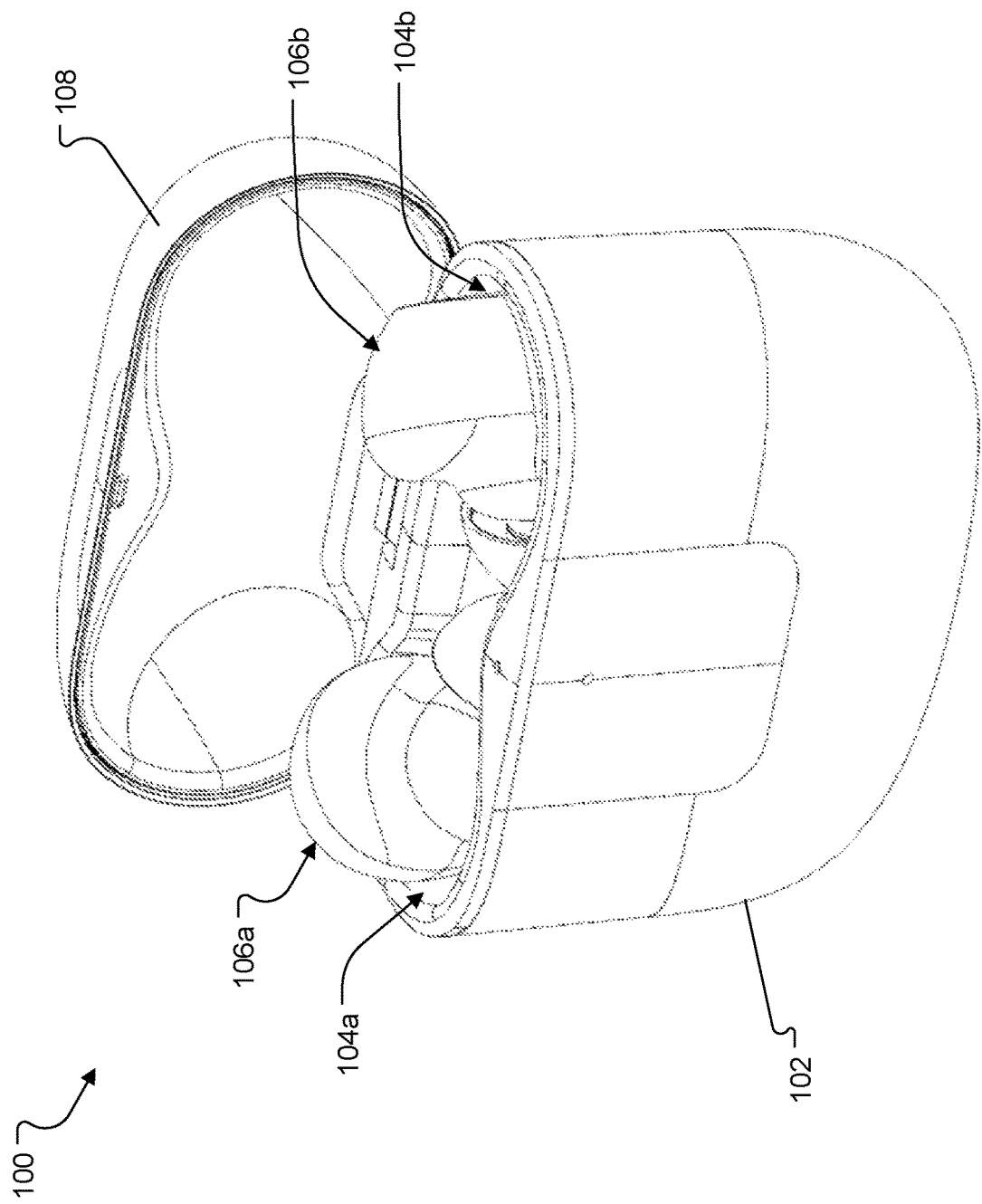
Figure 1C:
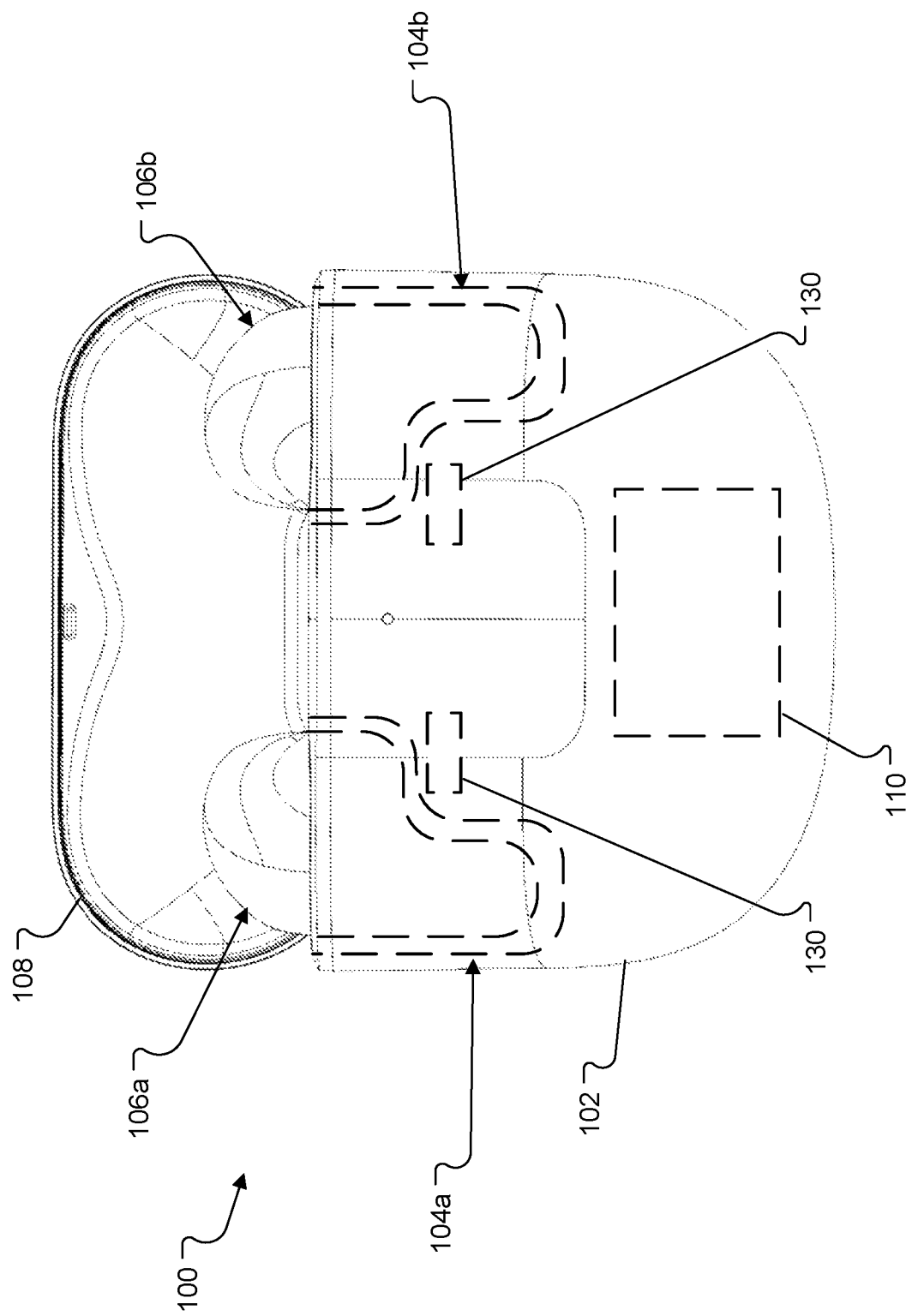
FIG. 1C is a front view of the charging case and earbuds of FIG. 1A.

FIG. 1 depicts a simplified plan view of a case 100 for a pair of wireless earbuds according to some implementations of the disclosure. As shown in FIG. 1, the case 100 includes a lower housing 102 having one or more the cavities 104a, 104b configured to receive a pair of earbuds 106a, 106b. In some implementations, the cavities 104a, 104b can be positioned adjacent to each other on opposite sides of a center plane of the case 100. Each cavity 104a, 104b can be sized and shaped to match that of its respective earbud 106a, 106b. Implementations of the disclosure are not limited to any particular shape, configuration or number of the cavities 104a, 104b and in other implementations the cavities 104a, 104b can have different shapes to accommodate different types of earbuds, different configurations and/or can be a single cavity or more than two cavities.

The case 100 further includes a lid 108 that is pivotably attached to the lower housing 102. The lid 108 is operable between a closed position where the lid 108 is aligned over one or more the cavities 104a, 104b fully enclosing the pair of earbuds 106a, 106b within the housing, and an open position where the lid 108 is displaced from the lower housing 102 and the cavities 104a, 104b such that a user can remove the earbuds 106a, 106b from the cavities 104a, 104b or replace the earbuds 104a, 104b within the cavities 106a, 106b. In some implementations the case 100 can also include a charging system 110 (FIG. 1C) configured to charge the pair of earbuds 106a, 106b; one or more magnets 130 (FIG. 1C) configured to orient and retain the pair of earbuds within one or more the cavities 104a, 104b; and other features that are further described below.

Figure 2:
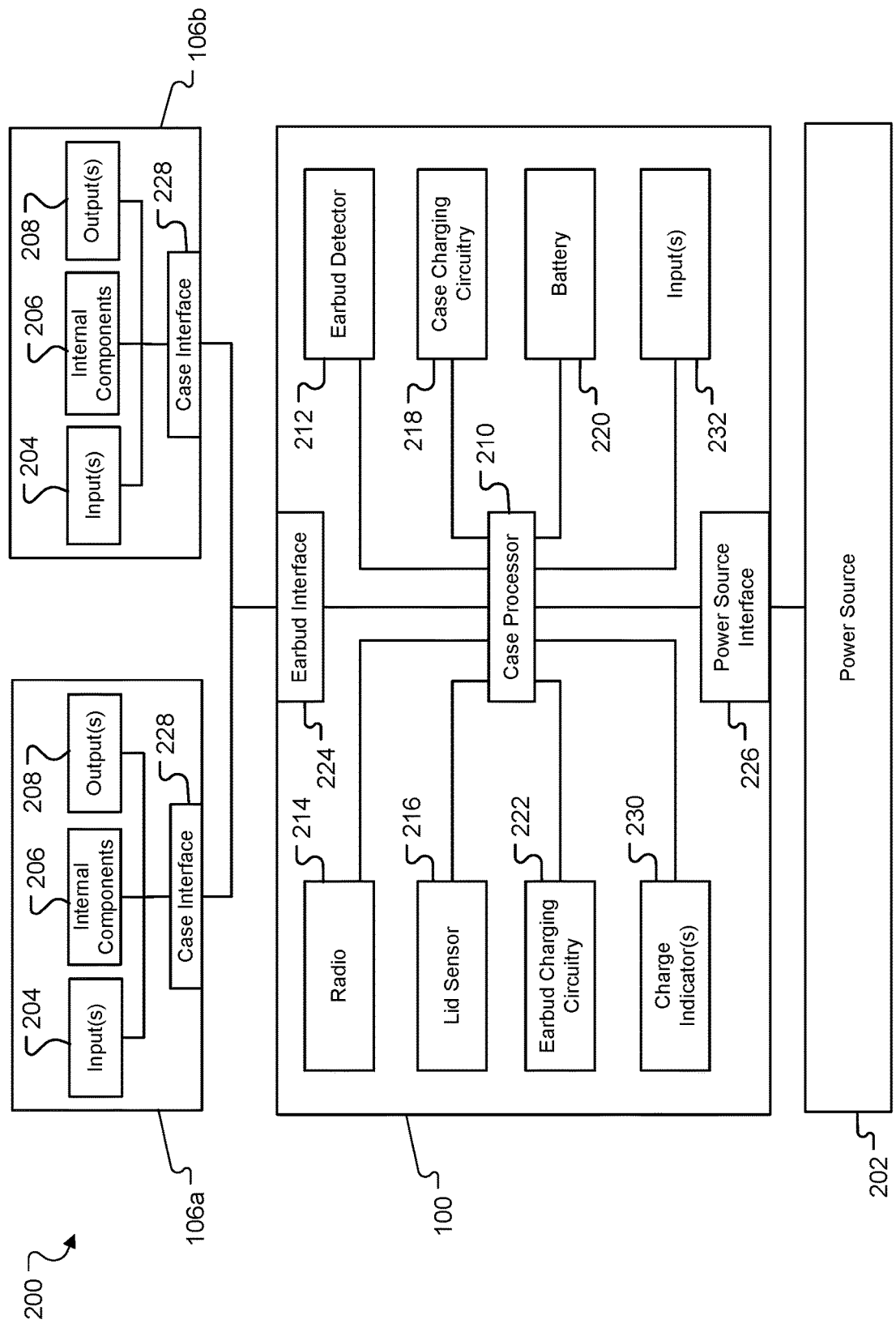
FIG. 2 is a diagrammatic view of a charging system including the charging case and earbuds of FIG. 1A.

FIG. 2 is a simplified block diagram of a system 200 according to an implementation of the present disclosure. The system 200 can include the earbuds 106a, 106b, a case 100, and a power source 202 for charging the case. The earbuds 106a, 106b can be positioned within the case 100 (e.g., within an interior space or cavity of the case defined by a housing or an insert within the housing) where they can be conveniently stored and charged. The case 100 can be representative of the case 100 and the earbuds 106a, 106b can be representative of the earbuds 106a, 106b discussed above with respect to FIG. 1.

Each earbud 106a, 106b can each have one or more inputs 204, internal components 206 and one or more outputs 208. In some implementations, the one or more inputs 204 can be a microphone input and one or more buttons or sensors that register a user's touch. In various implementations, an accelerometer or a capacitive sensor can be used as an input 204 and can be activated, for example, by a user to answer a call or command the earbuds 106a, 106b to enter a pairing mode that can be indicated by a light on either or both earbuds. In various implementations one or more internal components 206 can include a speaker, a microphone, a rechargeable battery, a processor, and/or other circuitry and components. In various implementations one or more outputs 208 can be audio from a speaker, a light or other indicator. In some implementations, the indicator light can indicate an incoming call, a battery charge level, a pairing mode or other function.

In some implementations, each of the earbuds 106a, 106b can include a wireless radio that can be both an input 204 and an output 208 device. The wireless radio can enable the earbuds to receive an audio signal from an audio player, such as a smart phone. In some implementations one or more of the earbuds 106a, 106b include a radio that can also transmit an audio signal such as a microphone signal from one or more of the earbuds. In yet further implementations, one or more of the earbuds 106a, 106b can include a radio that can transmit communication signals that can command the receiving device (e.g., a host device such as a smartphone) to perform one or more functions such as, but not limited to, connect a phone call, disconnect a phone call, pause audio playback, fast forward or rewind audio playback or mute a microphone signal. The wireless radio can employ any short range, low power communication protocol such as Bluetooth®, low power Bluetooth®, or Zigbee among protocols.

The case 100 can include a case processor 210, an earbud detector 212, radio 214, a lid sensor 216, case charging circuitry 218, a battery 220 and earbud charging circuitry 222. The case 100 can also include an earbud interface 224 that enables circuitry within the case 100 to communicate with and/or charge the earbuds 106a, 106b and a power source interface 226 that couples the case to the wired or wireless power source 202, such as an AC or DC power source or an inductive charging pad. In some implementations, the case charging circuitry 218, the battery 220, the earbud charging circuitry 222 and the interfaces 224 and 226 are all representative components of the charging system 110 shown in FIG. 1.

The power source interface 226 can be part of a receptacle connector for a micro USB connector, or other connector that can provide power to earbud the case 100. Alternatively, or in addition to a receptacle connector, the power interface 226 can include a wireless power receiver, such as one or more wireless power receiving coils, that can receive inductive power from the power source 202. The earbud interface 224 can transfer power and/or data between the case 100 and the earbuds via a case transfer interface 228 in each earbud. The earbud interface 224 can include an electrical connector or a wireless power transmitter, such as a wireless power transmitting coil that can transmit inductive power to an inductive power receiver within the earbuds.

The case processor 210 can be configured to control various functions of the case 100. In some implementations, the earbud detector 212 includes one or more sensors that detect when one or both of the earbuds 106a, 106b are placed within the case 100. In one implementation the earbud detector 212 can be a circuit that periodically "pings" the earbud contacts within the case 100 to determine if either earbud 106a, 106b is present. In other implementations, the earbud detector 212 can be any type of mechanical or electrical sensor, such as, but not limited to, a magnetic sensor, an optical sensor, a switch, a hall effect sensor, a flux sensor, a capacitive sensor, a photodetector, a proximity detector, a momentary switch or any other type of sensor.

In one example, the earbud detector 212 can include first and second earbud detectors—one detector for each of the cavities 104a, 104b. The first earbud detector can be operatively coupled to detect when an earbud (e.g., a left earbud) is inserted within a first of the cavities and the second earbud detector can be operatively coupled to detect when an earbud (e.g., a right earbud) is inserted within the other cavity. In other implementations a single detector can detect when either earbud 106a, 106b is placed within the case 100.

In response to detecting the insertion of an earbud within the case, earbud detector 212 can generate a detect signal that can be sent to and processed by other circuitry within the case 100 to initiate charging of the buds. When earbud detector 212 includes first and second detectors that can detect the insertion of the left and right earbuds (or first and second earbuds that are interchangeable between the left and right ears), respectively, each earbud detector can generate a separate detect signal that can initiate charging of the detected earbud only.

Similar to initiating charging, earbud detector 212 can also be used to stop charging. For example, earbud detector 212 can detect when either or both of the earbuds are removed from the case and generate a removal signal that stops the charging of the removed earbud or earbuds.

In some implementations, the case processor 210 can communicate with the earbuds 106a, 106b by sending and receiving data through earbud interface 224 (and through case interface of either or both earbuds) and can communicate with the power source 202 by sending and receiving data through power source interface 226. That is, in various implementations earbud interface 224 and power source interface 226 can be capable of carrying both power and data signals for single or bidirectional communication. In some implementations separate power and data contacts can be used while in various implementations one set of contacts is used for both power and data. For example, in some implementations, the power source 202 can be a computing device that communicates with power source interface 226 through an interface (not shown), such as a USB interconnect. The interconnect can provide DC current to case battery 220 for charging and can provide bidirectional communication between case processor 210 and the computing device. In another example the power source 202 can transmit firmware updates to both the case processor 210 and the earbuds 106a, 106b through the same contacts that are used to charge the devices. Data communication between earbud interface 224 and the earbuds 106a, 106b can use a similar communication protocol as discussed above or any other protocol such as, for example, serial communications.

In some implementations the case 100 can include a wireless radio 214 that enables the case to transmit and receive data communications with the earbuds 106a, 106b and a host device (e.g., a smartphone, a tablet computer, a laptop computer or the like) in addition to, or instead of, relying on data exchange through interfaces 224 and 226. For example, wireless radio 214 can be used to initiate a pairing sequence between the earbuds 106a, 106b and a host device. In another example radio 214 can be used to receive a music download from a host device to be stored in the case 100.

Lid sensor 216 can detect when a lid to the case (e.g., the lid 108 shown in FIG. 1) is in the open position and when the lid is in the closed position. In some implementations case processor 210 is coupled to lid sensor 216 and receives signals from the lid sensor indicating when the lid is opened and closed. More specifically, in some implementations lid sensor 216 can generate and send an "open" signal to processor 210 upon detecting when the lid is opened, and lid sensor 216 can generate and send a "closed" signal to processor 210 upon detecting the closure of the lid. Processor 210 can be configured to communicate with the earbuds 106a, 106b to turn ON their wireless radios when the lid is in the open position (e.g., in response to receiving the "open" signal) so they are ready for use by a user and turn OFF their wireless radios when the lid is in the closed position (e.g., in response to receiving the "closed" signal) to conserve their power. In various implementations lid sensor 216 can also trigger case processor 210 to enter a pairing mode when the case lid is opened. In some implementations, the case processor 210 can communicate with the earbuds 106a, 106b through earbud interface 224 and case interface 228 using a wired connection as discussed above, while in other implementations case processor 210 can communicate with the earbuds 106a, 106b through interfaces 224 and 228 wirelessly in addition to, or instead of, using a wired connection. In some implementations lid sensor 216 can be any type of mechanical or electrical switch including, but not limited to, a momentary switch, a capacitive sensor, a magnetic sensor (e.g., hall effect) or an optical sensor.

The case battery 220 provides power for the circuitry associated with the case 100 and can be a rechargeable battery that can be charged by the power source 202 and the case charging circuitry 218 through power source interface 226. The case battery 220 is also coupled to the earbud interface 224 and can charge the earbuds 106a, 106b in conjunction with earbud charging circuitry 222. In some implementations, the earbud charging circuitry 222 can charge the earbuds 106a, 106b anytime they are properly stored within the cavities 104a, 104b even though the case 100 is not coupled to the power source 202. Thus, the case 100 can be capable of charging the earbuds 106a, 106b while the case is, for example, in a user's pocket as long as case battery 220 has sufficient charge. In various implementations, the case battery 220 can be sealed within the case 100, while in some implementations the case battery can be removable for servicing and/or replacement with another charged battery. The case processor 210 can additionally be coupled to the case charging circuitry 218 that can control the charging of the case battery 220 (e.g., control the voltage and current supplied to the battery to optimize the speed of charging and the life of the battery). In some implementations, the case charging circuitry 218 can include a DC/DC converter, an AC/DC converter, battery voltage level monitoring circuitry and/or safety features to properly charge the case battery 220.

Similarly, in some implementations the case processor 210 can be coupled to the earbud charging circuitry 222 that can control the charging of batteries within the earbuds 106a, 106b (e.g., control the voltage and current supplied to the batteries to optimize the speed of charging and the life of the batteries) through the earbud interface 224. In various implementations the earbud charging circuitry 222 can include a DC/DC converter, battery voltage level monitoring circuitry and/or safety features to properly charge the earbud batteries.

In various implementations, the case 100 can include one or more charge indicators 230 that can indicate a charge level of case battery 220 and/or the earbud batteries such that a user can see the indicators on an outer surface of the case 100.

In some implementations, the case 100 can also include one or more user input devices 232. Each included input device 232 can be a button or other type of input that, in response to being activated by or otherwise receiving input from a user, generates a signal that can be communicated to the processor 210 or other circuitry within the case 100. The processor 210, or the other circuitry, can then act upon the signal. For example, in various implementations the wireless radios used by the earbuds 106a, 106b can be a Bluetooth® or other radio system that requires a pairing sequence to establish communication between the pair of earbuds and a wireless transmitter in an electronic device. In such implementations, if input device 232 is a wireless pairing button, the processor 210 can send a signal to the earbuds via the earbud interface 224 to place the wireless radios within the earbuds 106a, 106b into a pairing mode. More specifically, in some implementations the user can depress a pairing button located on the case 100 that notifies the case processor 210 to instruct the earbuds 106a, 106b via the earbud interface 224 to enter a pairing mode. In some implementations, the earbuds 106a, 106b can be required to be within the case (e.g., within the cavities 104a, 104b as shown in FIG. 1) while entering the pairing mode while in other implementations the earbuds may not need to be within the case 100 and only need to be within wireless communication range of the case.

Figure 3:
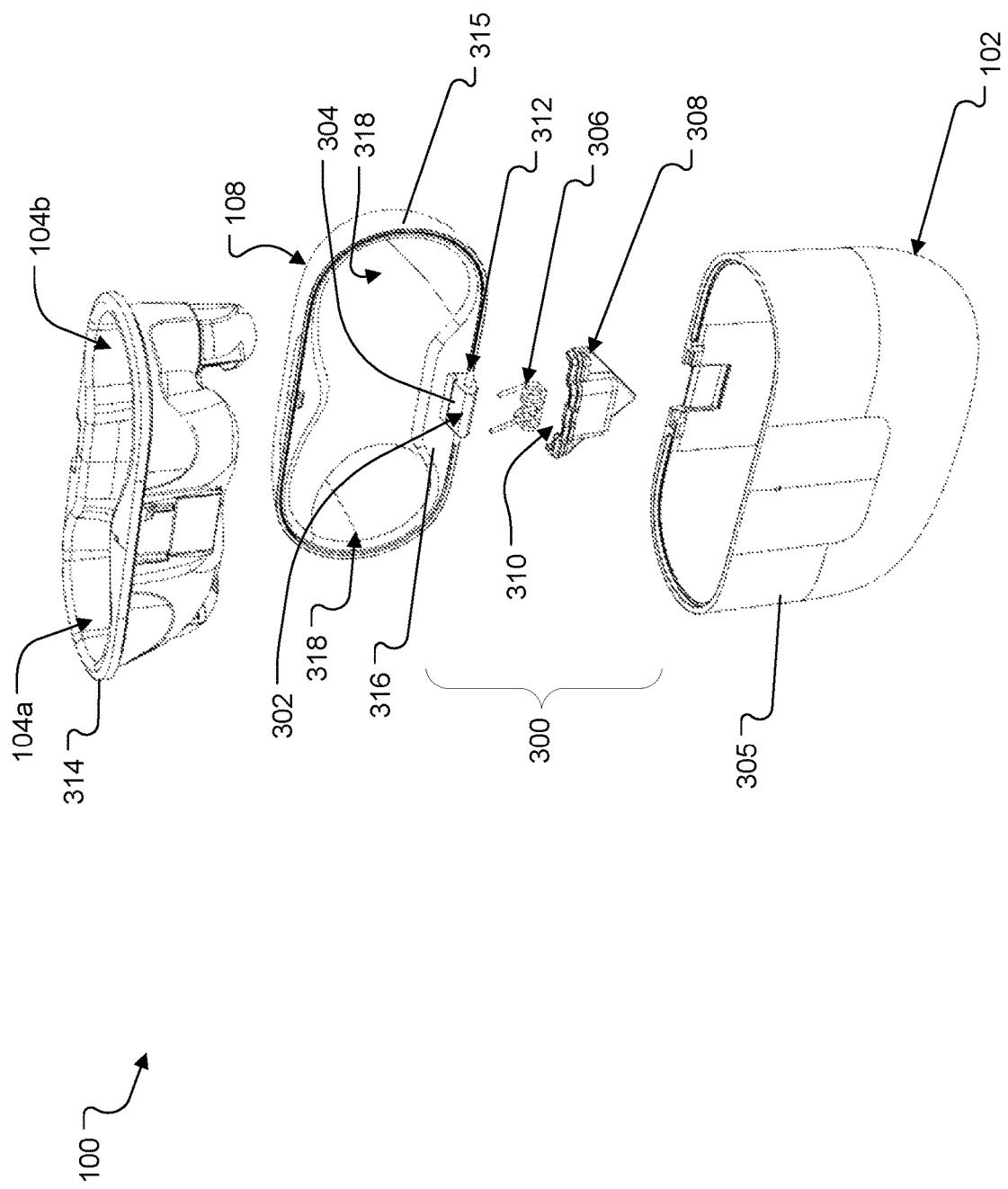
FIG. 3 is an exploded perspective view of the charging case of FIG. 1A.

As shown in FIG. 3, the case 100 includes the lower housing 102 that is pivotably coupled to the lid 108 via a hinge 300. In the illustrated example, the hinge 300 includes a cam 302 that is defined by an extension member 304 that is formed integrally with the lid 108, and a spring 306 (shown as a double torsion spring in the illustrated example).

The lower housing 102 includes a lower housing body 305 and a hinge cover 308 that is secured along an inner surface of the lower housing body 305 so as to define a pocket 310 for receiving and retaining the spring 306. The hinge cover 308 may be secured to the lower housing body 305 using adhesive or laser welding. Alternatively, the hinge cover 308 may be integrally formed, e.g., molded, with the lower housing body 305.

A hinge pin 312 extends through the extension member 304. Opposing free ends of the hinge pin 312 are exposed and are received in an open end of the lower housing body 305 during assembly such that cam 302 extends into the pocket 310 and into contact with spring 306 as will be discussed in greater detail below. The lower housing 102 also includes an inner tray 314 that covers the open end of the lower housing body 305 and the exposed portions of the hinge pin 310 thereby securing the lid 108 to the lower housing 102. The inner tray 314 may be bonded to the lower housing body 305 using an adhesive or laser welding. The inner tray 314 and the lower housing body 305 together define a cavity for housing the electronics, such as the charging system 110 of FIGS. 1 and 2. The inner tray 314 also defines the cavities 104a, 104b configured to receive the pair of earbuds 106a, 106b.

The lid 108 includes a lid body 315 and an upper cover 316 that is secured to an open end of the lid body 315. In the illustrated example, the lid body 315 defines the extension member 304 and the upper cover 316 defines a pair of upper cavities 318 that are complementary to respective upper surfaces of the earbuds 106a, 106b. The upper cover 316 may be bonded to the lid body 315 via adhesive or laser welding.

Each of the lower housing body 305, the lid body 315, the hinge cover 308, the inner tray 314, and the upper cover 316 may each be formed of a hard, plastic material such as polycarbonate or PC-ABS (polycarbonate-ABS).

Figure 4:
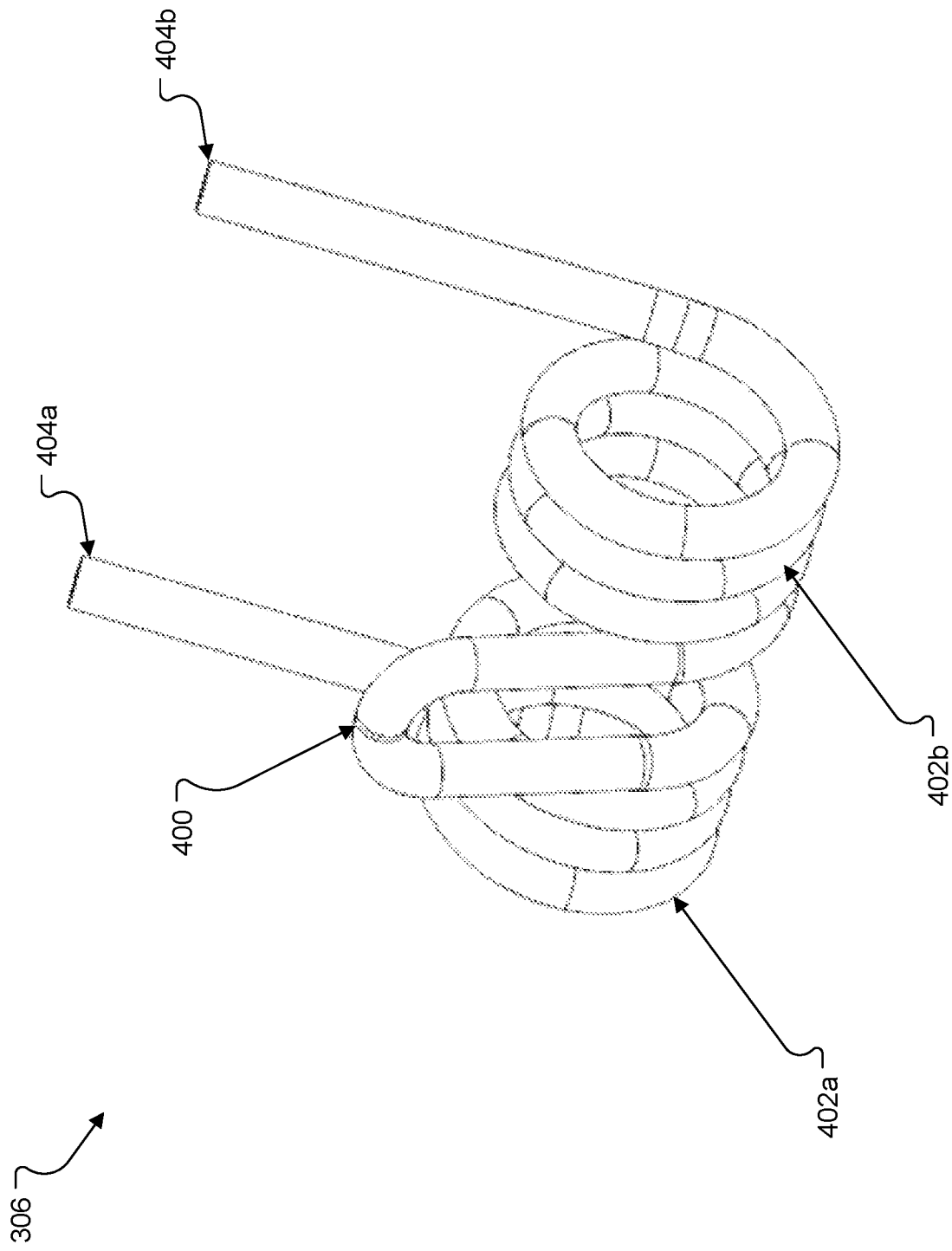
FIG. 4 is a front perspective view of a torsion spring from the charging case of FIG. 1A.

With reference to FIG. 4, the spring 306 is formed with a wire base 400 that is disposed between and integral with a pair of coils 402a, 402b, and a pair of wire legs 404a, 404b that each extend from a distal end of a corresponding one of the coils 402a, 402b. The spring 306 may be formed of a metal such as steel, e.g., stainless steel. In some implementations, the spring 306 may be plated to match a color of the lower housing 102 and/or the lid 108. A lubricant can be added to the legs 404a, 404b for wear prevention since it is a metal on plastic contact point. A suitable lubricant is available under the tradename MOLYKOTE® from DuPont de Nemours, Inc. of Wilmington, Del.

Figure 5:
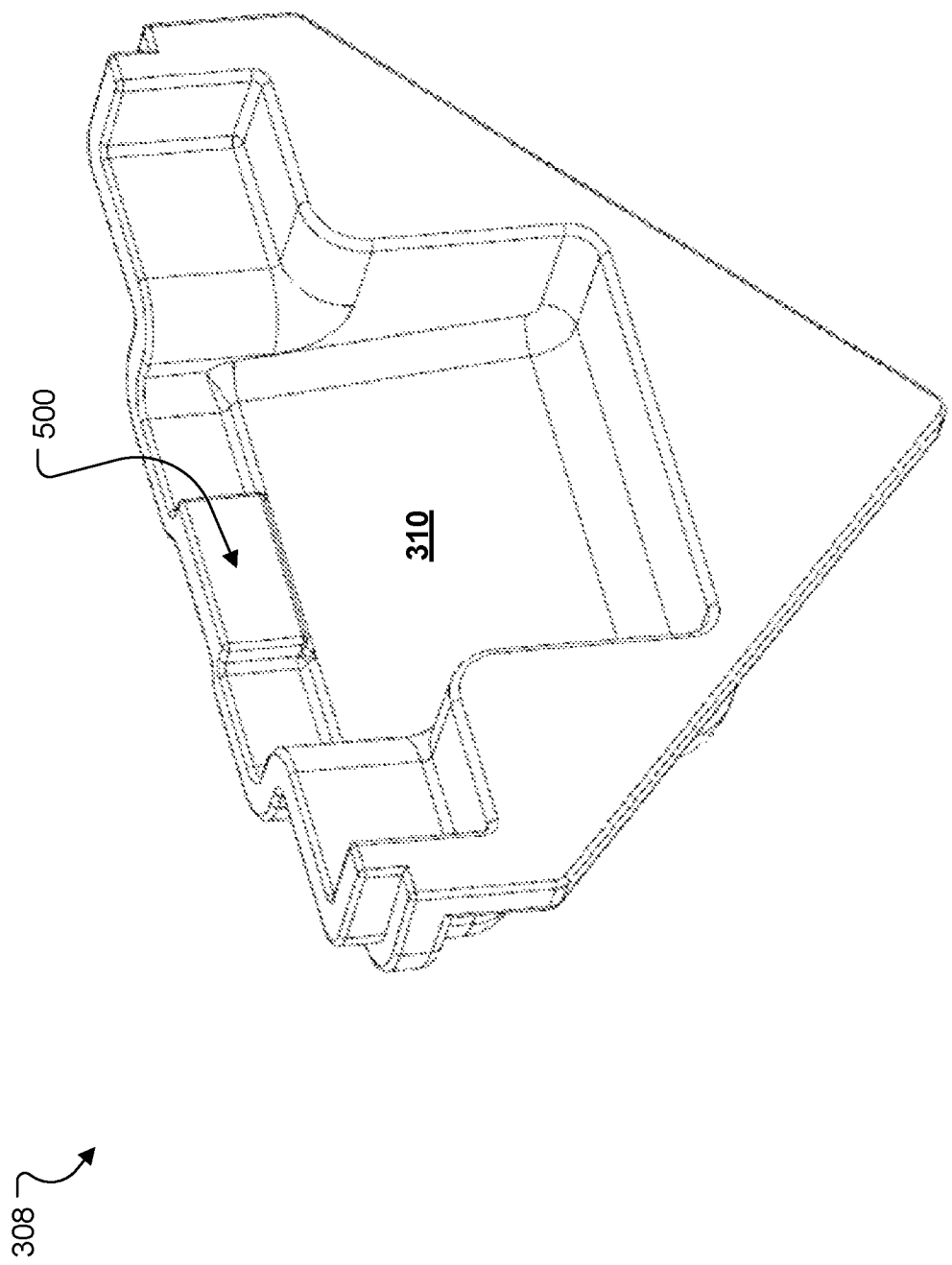
FIG. 5 is a rear perspective view of a hinge cover from the charging case of FIG. 1A.
Figure 6:
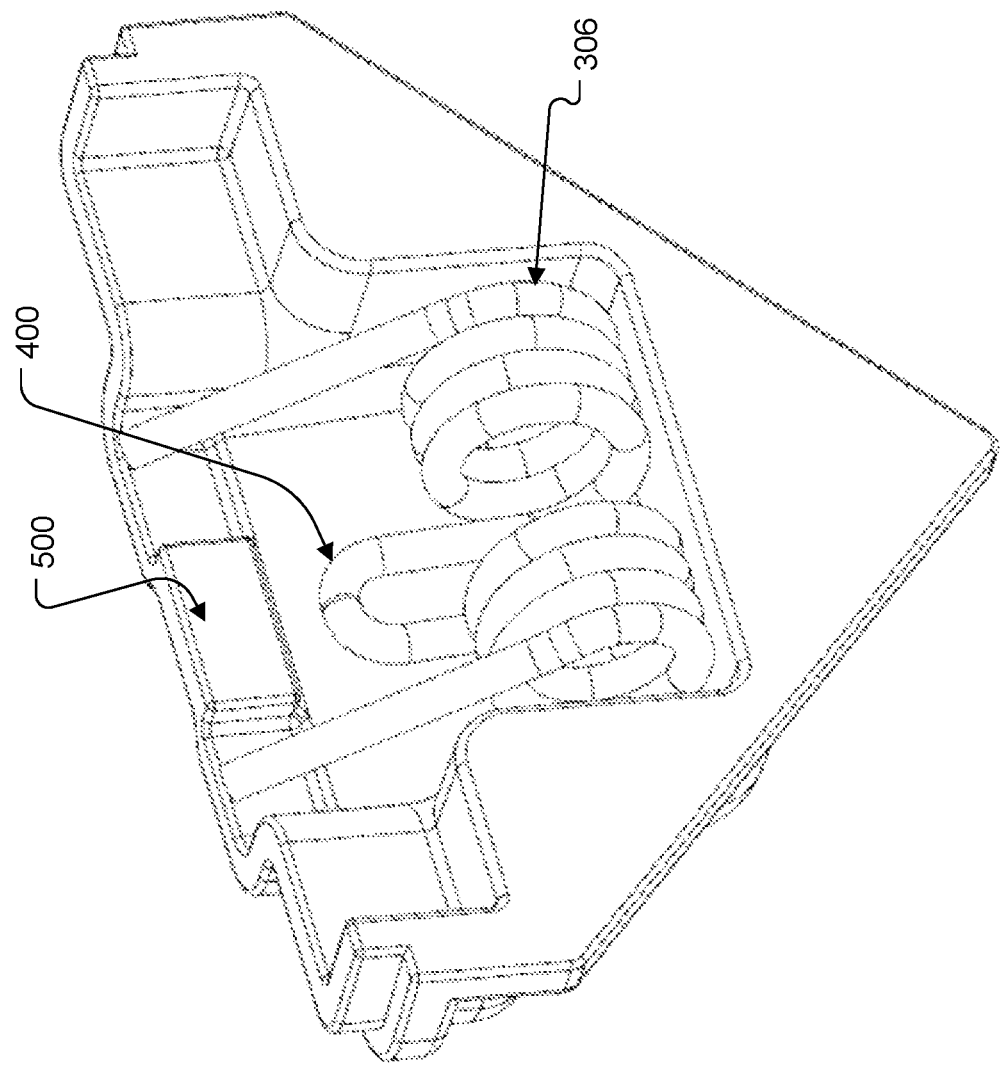
FIG. 6 is a rear perspective view showing the torsion spring of FIG. 4 supported in the hinge cover of FIG. 5.

Referring to FIGS. 5 and 6, the hinge cover 308 includes a lip 500 along its inner surface. The lip 500 acts as a stop against the wire base 400 of the spring 306, thereby inhibiting the spring 306 from moving out of the pocket 310.

Figure 7A:
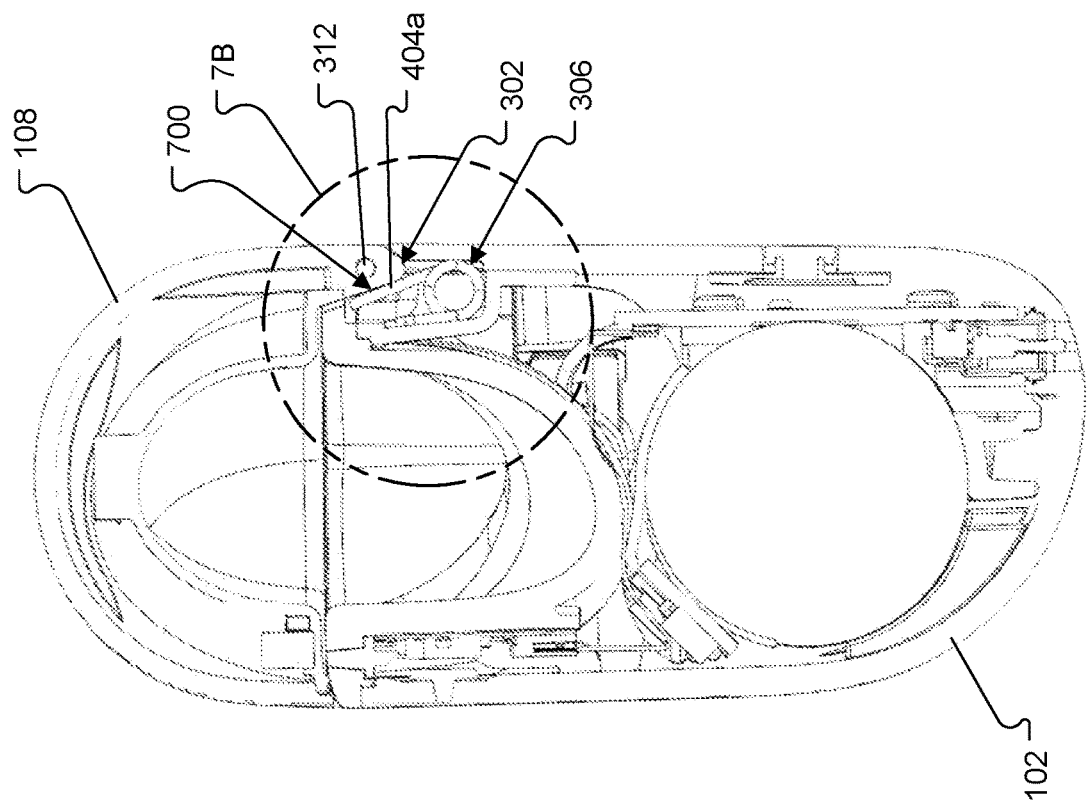
FIG. 7A is a cross-sectional side view of the charging case of FIG. 1A shown in a fully closed position.
Figure 7B:
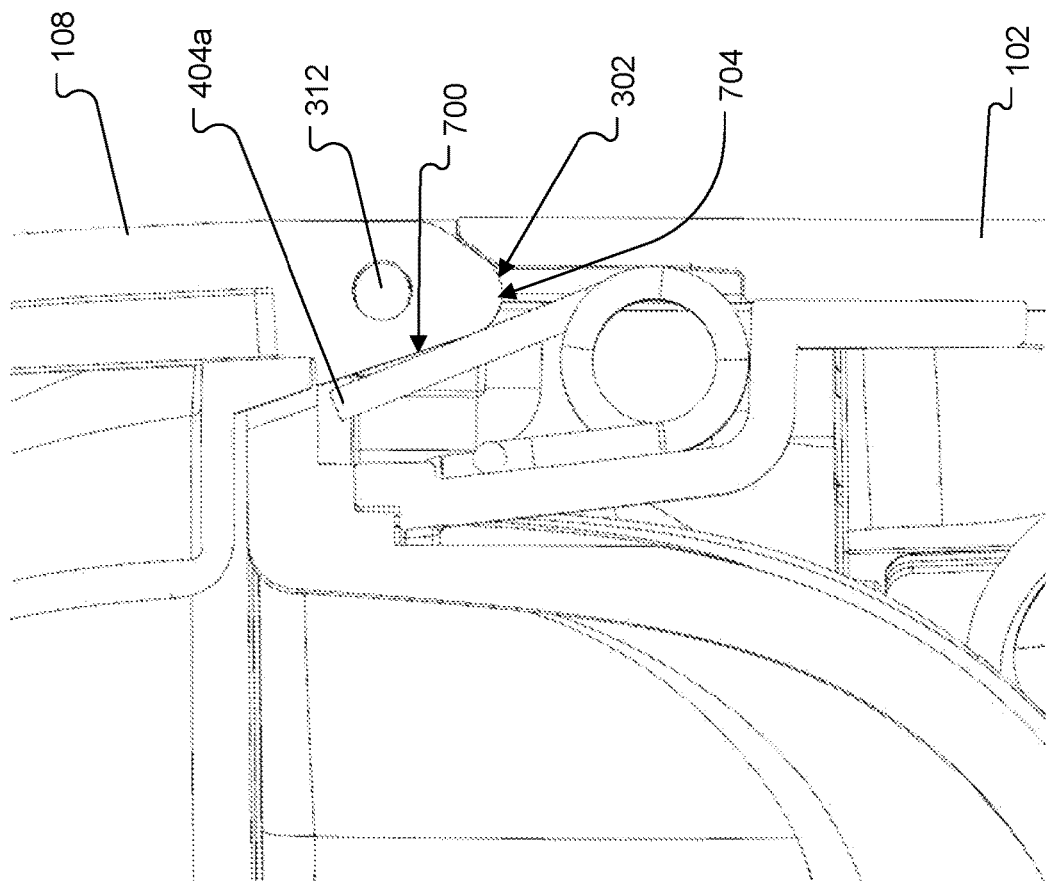
FIG. 7B is a detail from FIG. 7A.

With reference to FIGS. 7A & 7B, when the case 100 is in the closed position, the legs 404a, 404b (one shown in FIGS. 7A & 7B) of the spring 306 are flat against a flat 700 on the cam 302. That provides a detent closed position. In this position, the legs 404a, 404b of the spring 306 are preloaded so that they are in intimate contact with the flat 700 and that is what resists opening and keeps the lid 108 closed. There is a moment arm acting on the spring 306 that is measured from the hinge pin 312. The resulting force is equal to the spring constant multiplied by the distance from the center of the hinge pin 312 to a tangent point 702 where a curve 704 of the cam 302 meets the spring 306 in the closed position. The force may be about 0.7 Newtons (N) to about 0.9 N, e.g., about 0.8 N. The wire base 400 rests substantially flat against the inner surface of the hinge cover 308 and remains in substantially the same position regardless of the position of the lid 108 relative to the lower housing 102.

Figure 7C:
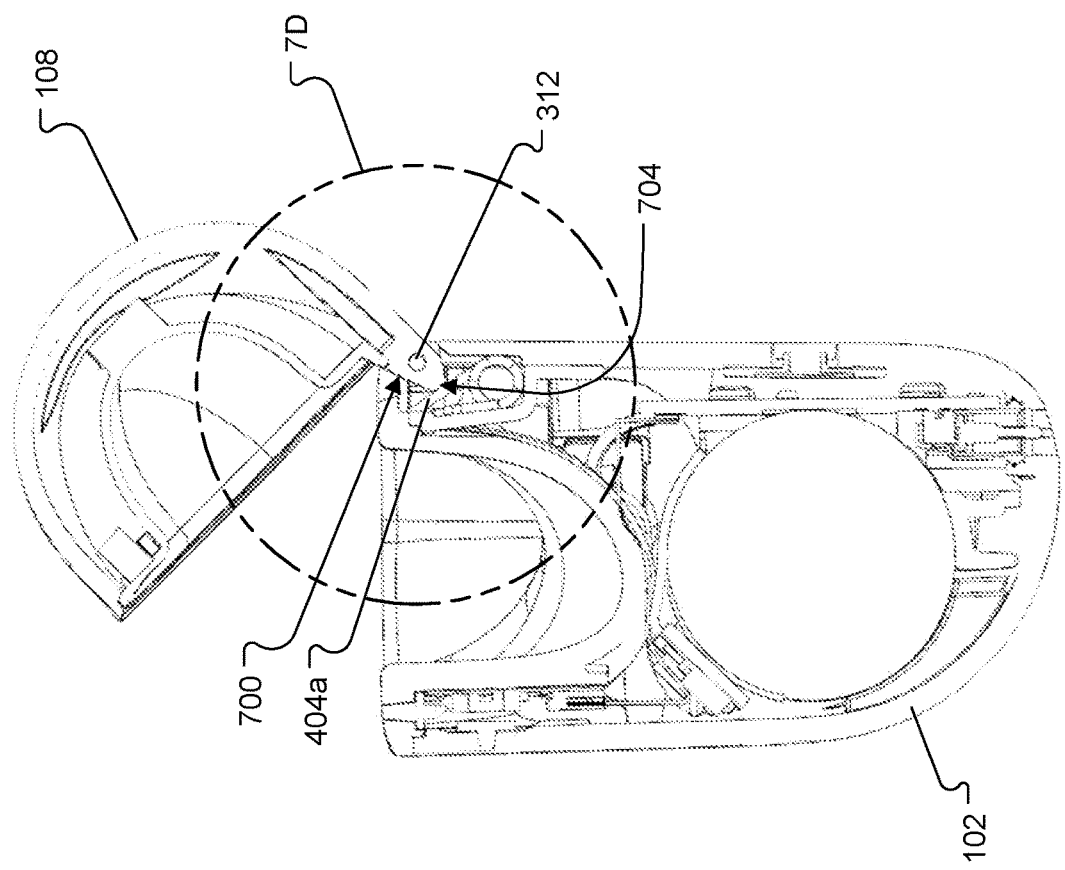
FIG. 7C is a cross-sectional side view of the charging case of FIG. 1A shown in a partially open position.
Figure 7D:
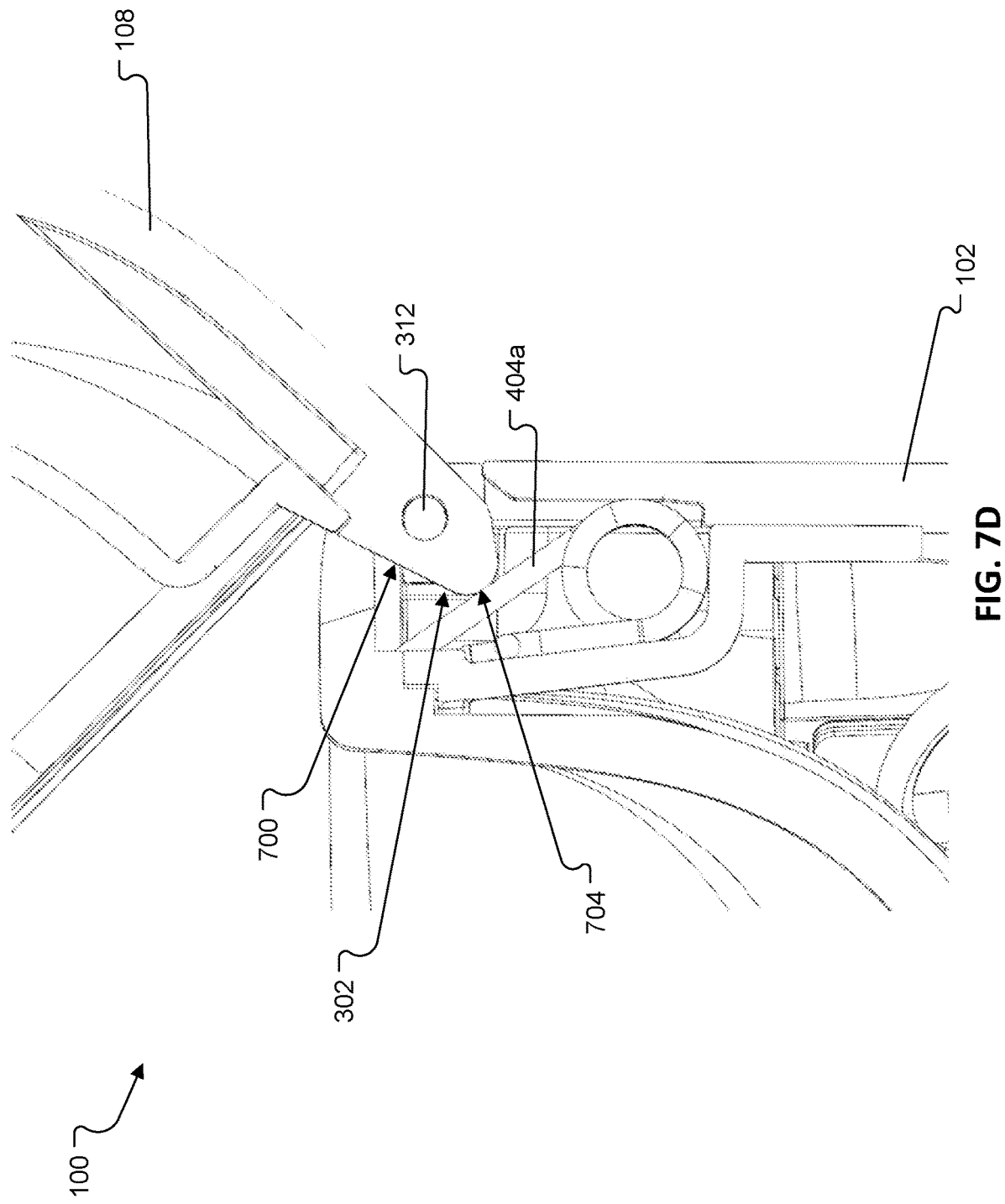
FIG. 7D is a detail from FIG. 7C.

Referring to FIGS. 7C & 7D, as lid 108 is rotated toward the open position, the legs 404a, 404b (one shown) move off the flat 700 and onto the curve 704 of the cam 302. Once the angle of the lid 108 relative to the lower housing 102 (as measured between the open end of the lid body and the open end of the lower housing body; i.e., between the inner tray and the upper cover) exceeds a detent angle, the lid 108 is no longer biased toward the closed position. The detent angle may be about 20 degrees to about 30 degrees, e.g., about 24 degrees, e.g., 24.28 degrees. In this position and all other positions other than closed the lid 108 is relying on a friction that provides a resistance as it is opening up the rest of the way. This enables the lid to be moved to an infinite number of stable positions between the closed position and the open position.

Figure 7E:
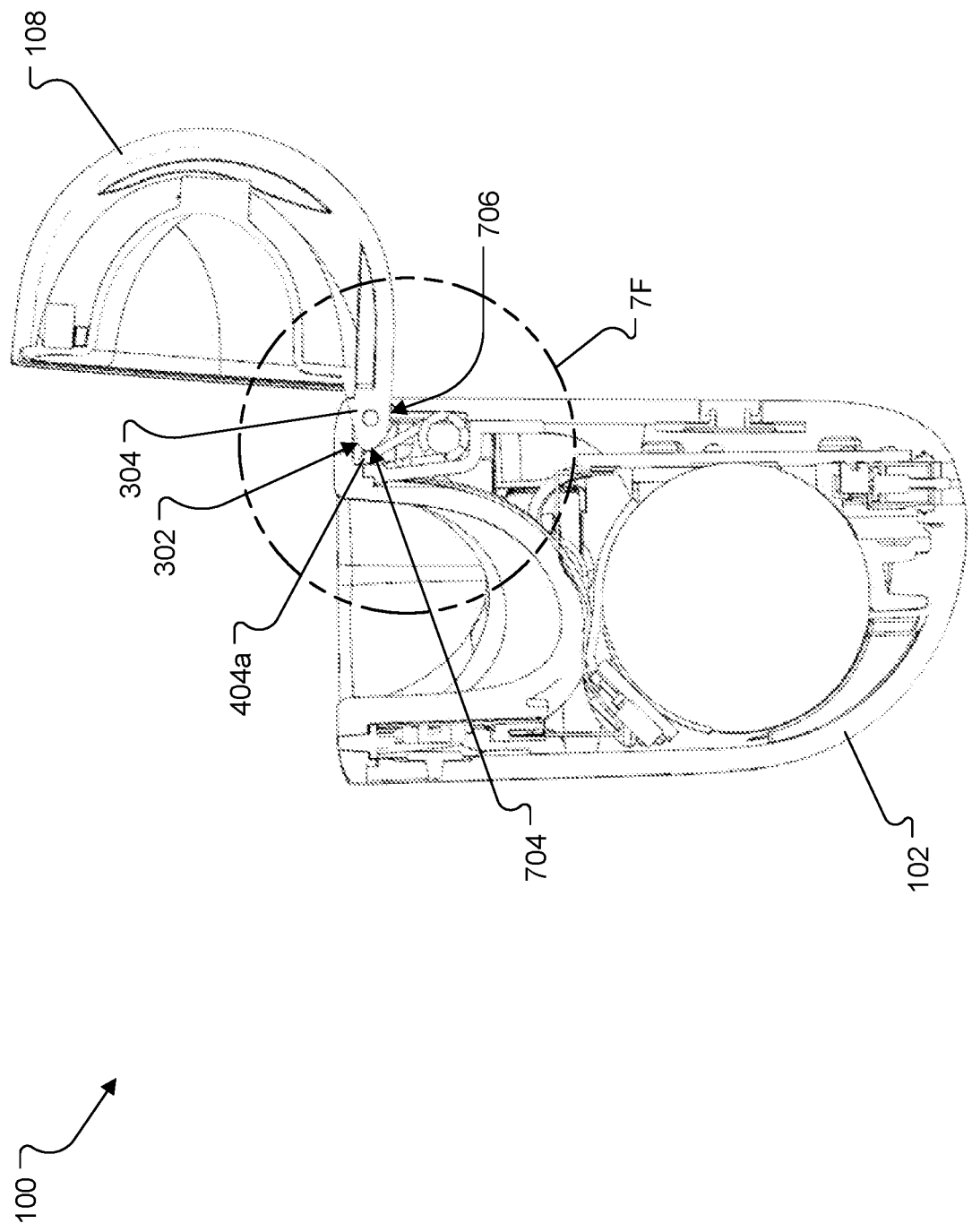
FIG. 7E is a cross-sectional side view of the charging case of FIG. 1A shown in a fully open position.
Figure 7F:
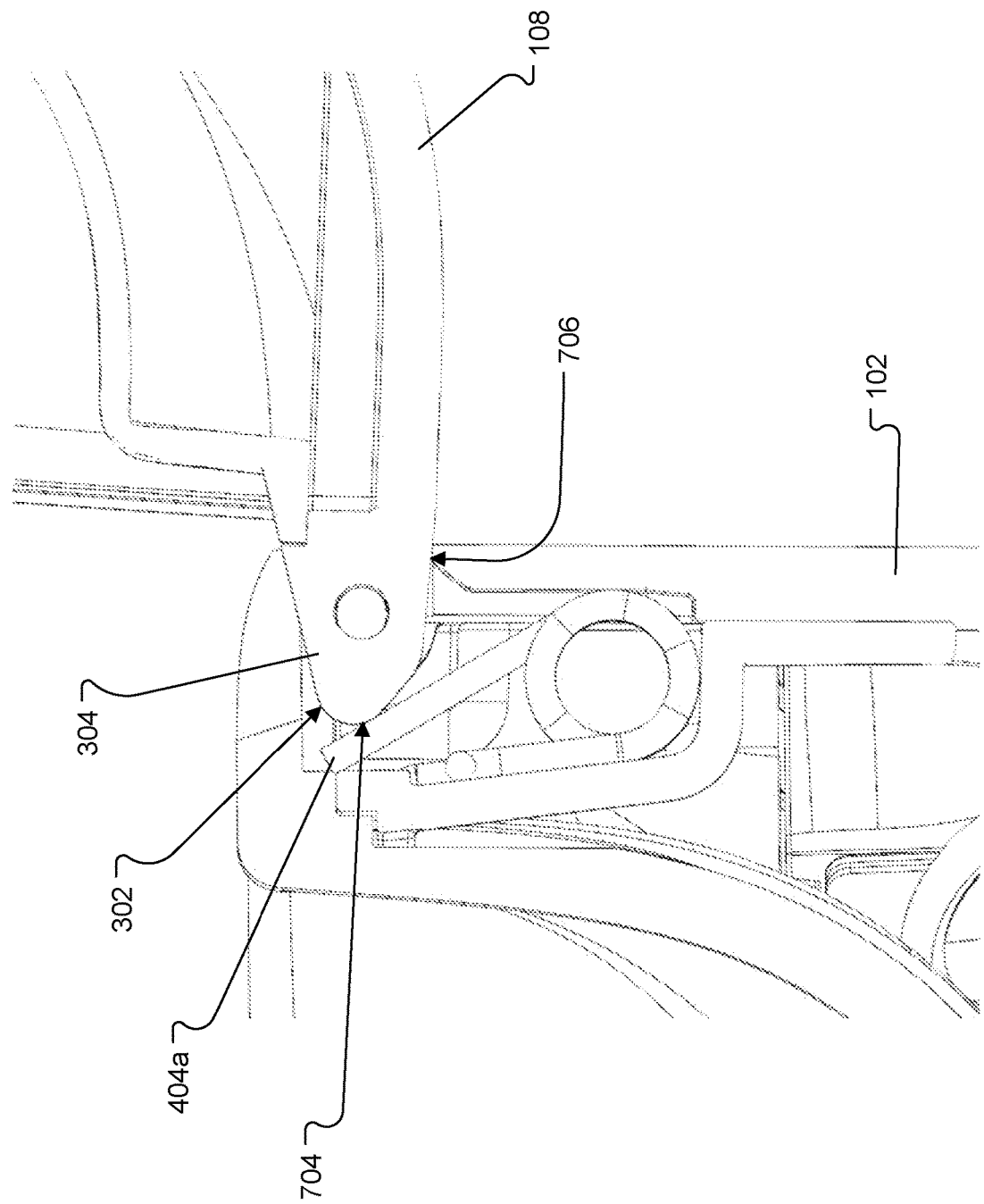
FIG. 7F is a detail from FIG. 7E.

As shown in FIGS. 7E & 7F, in the fully open position the legs 404a, 404b (only one shown) are still on the curve 704 of the cam 302, because of this it is just relying on friction all the way to keep the lid 108 open; i.e., there is no point during the rotation of the lid 108 at which it is impelled open. The back flat 706 of the extension member 304 is not part of the cam 302. It is just meeting the geometry of the back of the case. In the fully open position, there is a mechanical hard stop that is provided by the lower housing 102; i.e., there is an interference between the lower housing 102 and the lid 108 that inhibits further movement. The lid 108 opens a little more than 90 degrees, e.g., between about 92 degrees to about 98 degrees, e.g., about 95 degrees, to allow a user enough room to remove the earbuds 106a, 106b from the cavities 104a, 104b.

There are only two parts to the cam 302; i.e., the illustrated configuration only uses the flat 702 and the curve 704. In the illustrated example, it is one continuous cam 302 that acts on the two legs 404a, 404b of the double torsion spring 306. A single cam may be preferred for cosmetic reasons. In other implementations, it could be two discrete cam sections that each engage a corresponding one of the legs 404a, 404b. It can be better to have a single cam surface for tooling purposes, so there are not two different surfaces that can lead to tolerance mismatch. It can also be better for feel to have the cam made from the same surface of a tool.

Other Implementations

Figure 8:
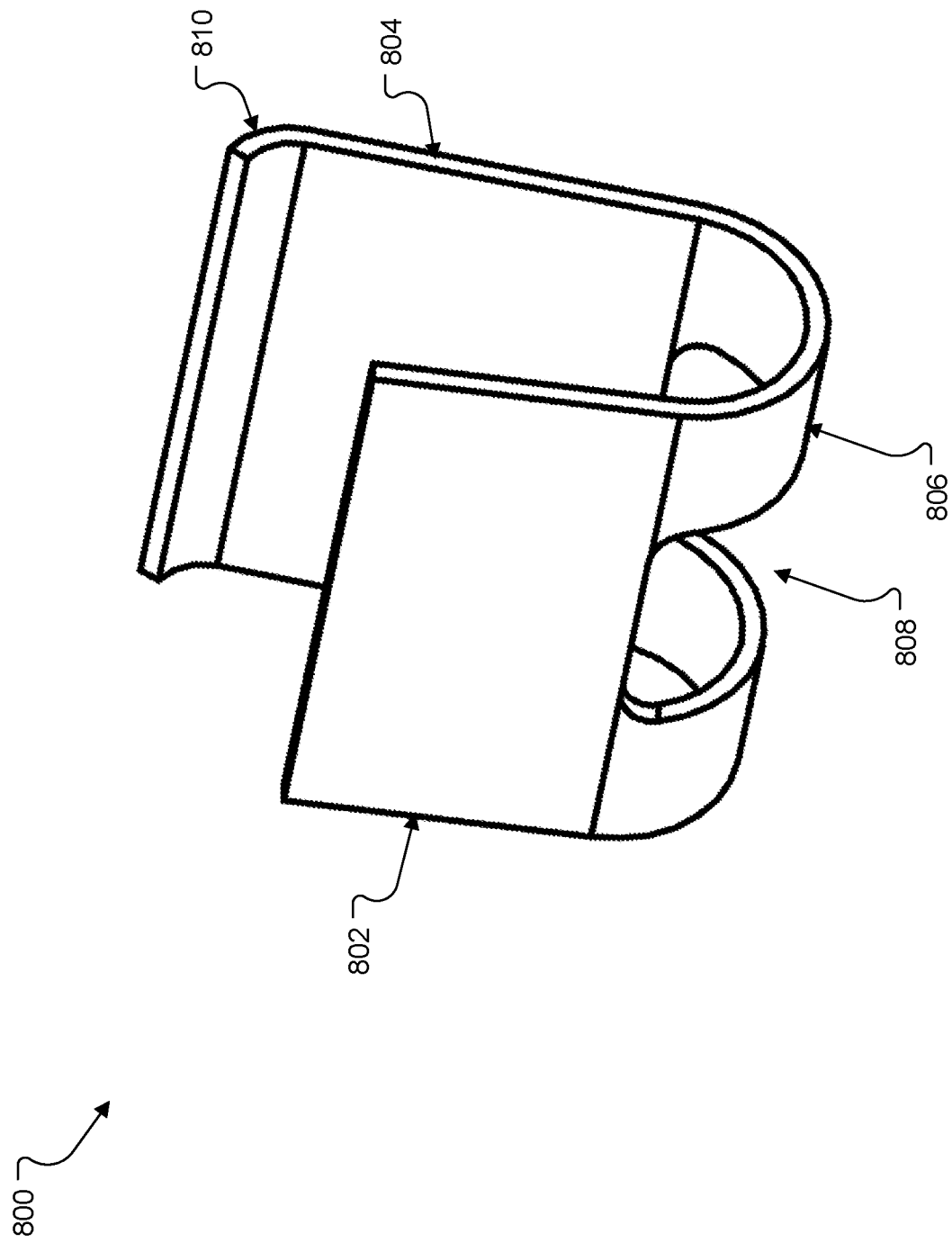
FIG. 8 is a front perspective view of a flat spring that may be used with the charging case of FIG. 1A.

FIG. 8 illustrates an alternative configuration for a spring 800, which may be used as an alternative to the torsion spring illustrated in FIG. 4. In the implementation illustrated in FIG. 8, the spring 800 is in the form of a flat spring. Flat springs are strips or bars of metal, or assemblies of such, that are formed to produce a repeatable counterforce when compressed or displaced and used for positioning and contacting. The spring 800 may be formed from a stamped sheet of material (e.g., stainless steel) that is formed to shape. The spring 800 is formed with a flat base 802 and a flat leg 804 that are coupled to each other via a bend region 806 to form a substantially u-shaped spring. Compliance provided by the bend region 806 allows the flat leg 804 to be resiliently displaced relative to the flat base 802. In the illustrated example, the bend region includes a radius. The flat base 802, the flat leg 804, and the bend region 806 may be integrally formed from a single piece of sheet material.

As shown in FIG. 8, the bend region 806 may include a notch 808. The dimensions of the notch 808 can be adjusted to achieve the desired spring force. The flat leg 804 may also include a radius 810 along its free end, opposite the bend region 806, to ensure that there is no sharp edge along that can touch the surface of the cam 302. A lubricant can be added to the flat leg 804 for wear prevention since it is a metal on plastic contact point. A suitable lubricant is available under the tradename MOLYKOTE® from DuPont de Nemours, Inc. of Wilmington, Del.

Figure 9A:
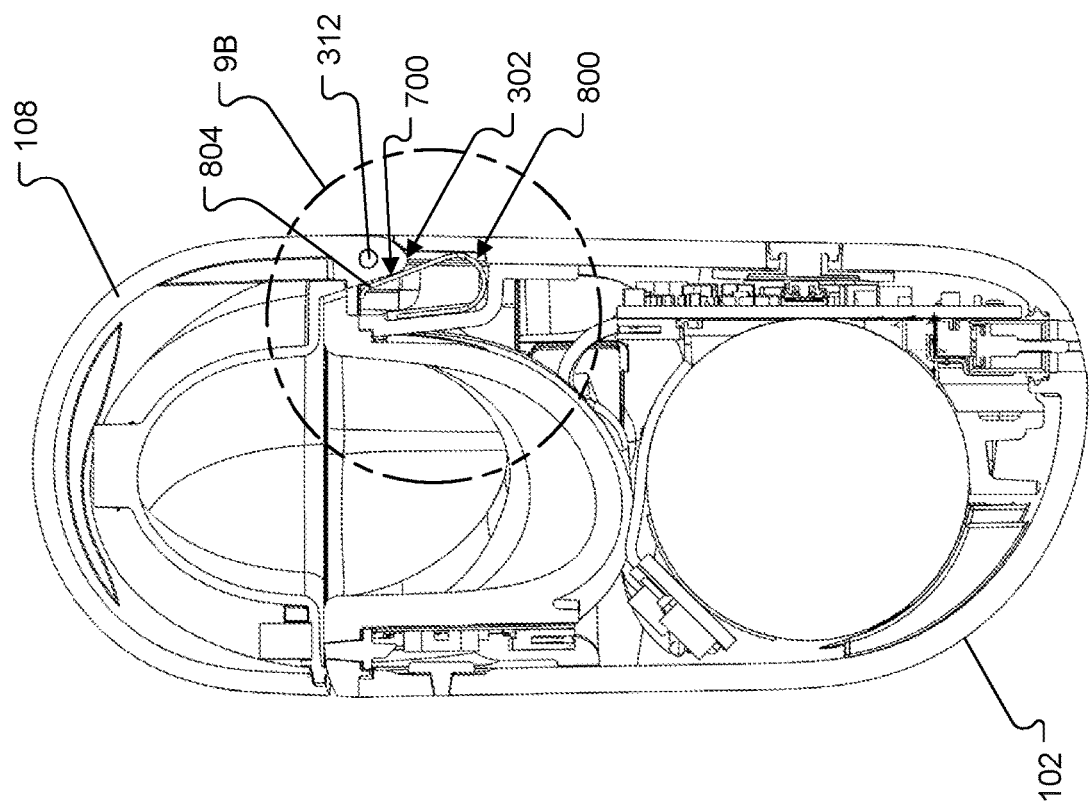
FIG. 9A is a cross-sectional side view of the charging case of FIG. 1A, using the flat spring of FIG. 8, shown in a fully closed position.
Figure 9B:
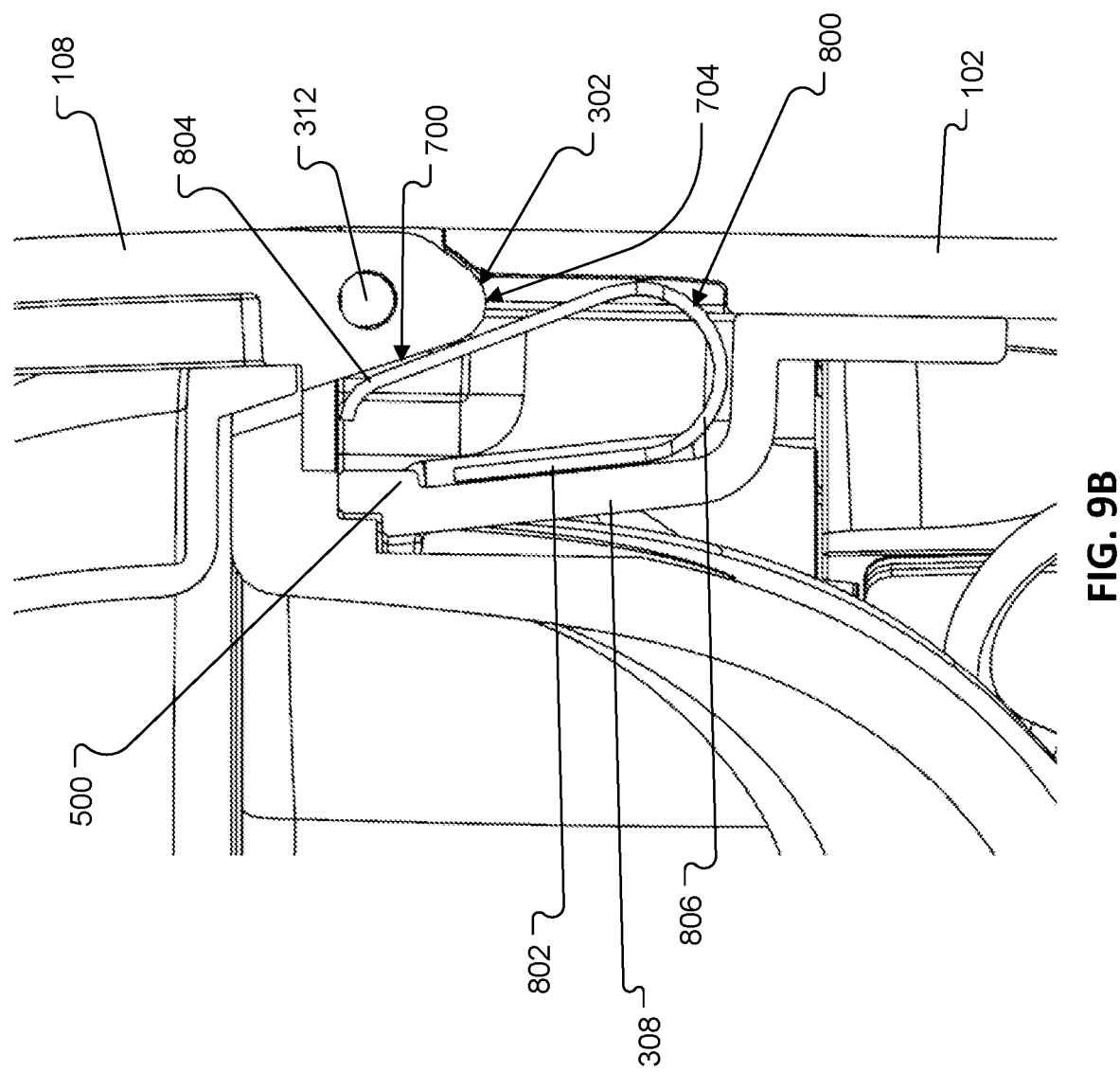
FIG. 9B is a detail from FIG. 9A.

With reference to FIGS. 9A & 9B, when the case 100 is in the closed position, the flat leg 804 of the spring 800 is flat against the flat 700 on the cam 302. That provides a detent closed position. In this position, the flat leg 804 of the spring 306 is preloaded so that it is in intimate contact with the flat 700 and that is what resists opening and keeps the lid 108 closed. There is a moment arm acting on the spring 800 that is measured from the hinge pin 312. The resulting force is equal to the spring constant multiplied by the distance from the center of the hinge pin 312 to a tangent point 702 where a curve 704 of the cam 302 meets the spring 306 in the closed position. The force may be about 0.7 Newtons (N) to about 0.9 N, e.g., about 0.8 N. The flat base 802 rests flat against the inner surface of the hinge cover 308 and remains in substantially the same position regardless of the position of the lid 108. The lip 500 along the inner surface of the hinge cover 308 can act as a stop against the flat base 802 of the spring 306, thereby inhibiting the spring 800 from moving out of the pocket 310.

Figure 9C:
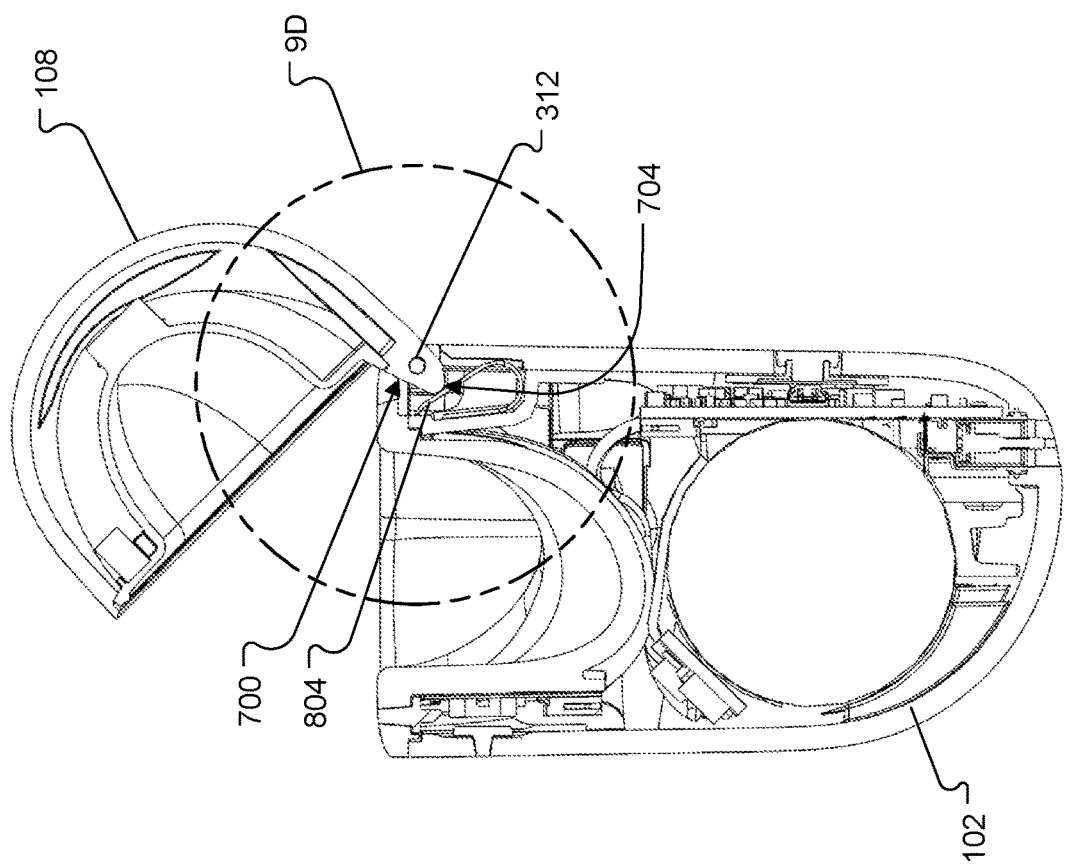
FIG. 9C is a cross-sectional side view of the charging case of FIG. 1A, using the flat spring of FIG. 8, shown in a partially open position.
Figure 9D:
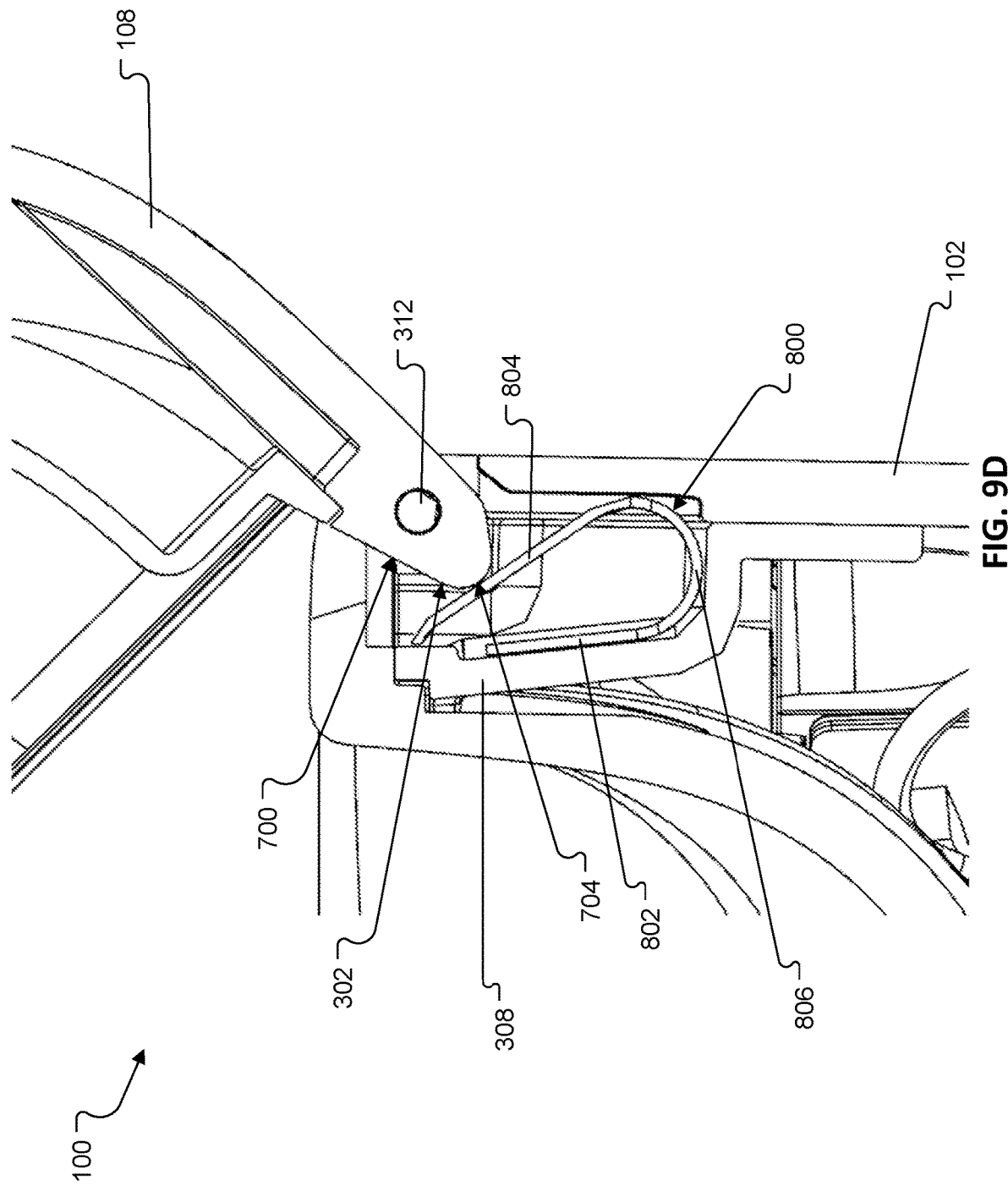
FIG. 9D is a detail from FIG. 9C.

Referring to FIGS. 9C & 9D, as lid 108 is rotated toward the open position, the flat leg 804 moves off the flat 700 and onto the curve 704 of the cam 302. Once the angle of the lid 108 relative to the lower housing 102 (as measured between the open end of the lid body and the open end of the lower housing body; i.e., between the inner tray and the upper cover) exceeds a detent angle, the lid 108 is no longer biased toward the closed position. The detent angle may be about 20 degrees to about 30 degrees, e.g., about 24 degrees, e.g., 24.28 degrees. In this position and all other positions other than closed the lid 108 is relying on a friction that provides a resistance as it is opening up the rest of the way. This enables the lid to be moved to an infinite number of stable positions between the closed position and the open position.

Figure 9F:
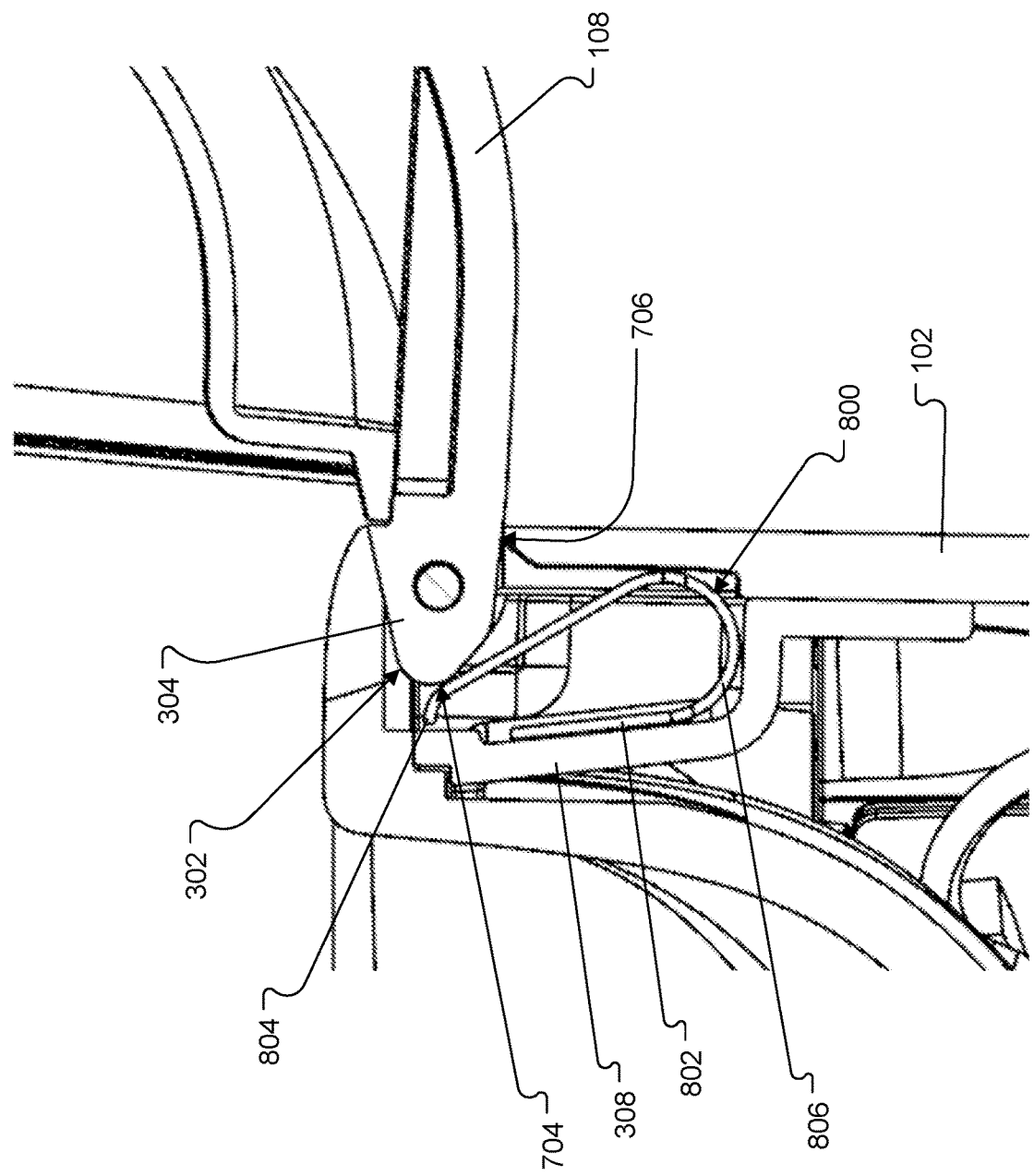
FIG. 9F is a detail from FIG. 9E.

As shown in FIGS. 9E & 9F, in the fully open position the flat leg 804 is still on the curve 704 of the cam 302, because of this it is just relying on friction all the way to keep the lid 108 open; i.e., there is no point during the rotation of the lid 108 at which it is impelled open. In the fully open position, there is a mechanical hard stop that is provided by the lower housing 102; i.e., there is an interference between the lower housing 102 and the lid 108 that inhibits further movement. The lid 108 opens a little more than 90 degrees, e.g., between about 92 degrees to about 98 degrees, e.g., about 95 degrees, to allow a user enough room to remove the earbuds 106a, 106b from the cavities 104a, 104b.

While a charging case for a pair of earbuds has been described, the charging case construction described above can be used for various other electronic devices, such as audio eyeglasses, e.g., as described in U.S. Pat. Nos. 10,670,890; 10,555,071; 10,951,976; and/or 10,820,086, or an audio module, e.g., as described in U.S. application Ser. No. 16/862,909, filed Apr. 30, 2020; and/or U.S. application Ser. No. 17/100,315, filed Nov. 20, 2020.

Although the hinge mechanisms described above make use of a double torsion spring or a flat spring, other biasing members are contemplated. In some cases, for example, the hinge mechanism may make use of coil compression spring that engages the cam. In certain implementations, the compression spring may act on a ball bearing that has direct contact with the cam. Alternatively, a slug of elastomer may be used as biasing element that contacts the cam.

While an implementation has been described in which a biasing member is supported in a lower housing of a charging case and an extension member is provided by a lid, in other implementations, the biasing member (e.g., spring) may be supported in the lid and the lower housing may provide the extension member.

Although an implementation has been described in which the hinge is configured such that, regardless of its orientation relative to the lower housing, the lid is not impelled toward the open position, in some implementations, the hinge may be configured such that the lid has one or more stable positions (e.g., an infinite number of stable positions) when the lid is arranged between the fully open and fully closed position, and such that the lid may also be impelled to the fully open position once it is opened beyond a certain angle relative to the lower housing portion. For example, the lid may be stable (i.e., not biased towards either the open or the closed position) when it is oriented between the detent angle and about 90 degrees relative to the lower housing, and it may be biased toward the fully open position once it exceeds an angle of 90 degrees relative to the lower housing. In the fully open position, the lid may be arranged at an angle between about 92 degrees to about 98 degrees, e.g., about 95 degrees, relative to the lower housing.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A case for an electronic device, the case comprising:
   a lower housing having a cavity to receive the electronic device;
   an electrical connector configured to couple to the electronic device;
   a lid attached to the lower housing with a pivotable joint allowing the lid to rotate between a fully closed position where the lid is aligned over the cavity and a fully open position where the lid is angularly displaced allowing the electronic device to be removed from the cavity; and
   a hinge providing the pivotable joint and configured such that, when the lid is in the fully closed position, it is biased to remain closed via a detent, and, such that the lid has one or more stable positions between the fully open and fully closed positions.

2. The case of claim 1, wherein the hinge is configured such that regardless of its orientation relative to the lower housing, the lid is not impelled toward the fully open position.

3. The case of claim 1, wherein the hinge comprises an extension member and a biasing member that engages the extension member to provide the detent.

4. The case of claim 3, wherein the extension member comprises a cam.

5. The case of claim 4, wherein the cam comprises a flat and a curve and wherein, in the fully closed position, the biasing member engages the flat to provide the detent.

6. The case of claim 5, wherein, in the fully open position, the biasing member engages the curve.

7. The case of claim 6, wherein, in a plurality of stable positions between the fully closed position and the fully open position, the biasing member engages the curve.

8. The case of claim 7, wherein, in each of the plurality of stable positions between the fully closed position and the fully open position, friction between the cam and the biasing member holds the lid stable relative to the lower housing.

9. The case of claim 3, wherein the biasing member comprises a spring.

10. The case of claim 9, wherein the spring comprises a double torsion spring.

11. The case of claim 9, wherein the spring comprises a flat spring.

12. The case of claim 9, wherein the spring is coated with a lubricant to prevent wear on the cam.

13. The case of claim 3, wherein the biasing member engages the extension member to provide an infinite number of stable positions of the lid relative to the lower housing between the fully closed position and the fully open position.

14. The case of claim 3, wherein the biasing member is supported in the lower housing and the extension is defined by the lid.

15. The case of claim 14, wherein the lower housing includes a lower housing body and a hinge cover that together define a pocket for supporting the biasing member.

16. The case of claim 15, wherein the hinge cover comprises a lip along its inner surface, wherein the lip inhibits the spring from moving out of the pocket.

17. The case of claim 15, wherein the lower housing further comprises an inner tray that defines the cavity and covers the pocket.

18. The case of claim 17, further comprising a hinge pin that extends through the extension member, wherein the hinge pin is received in the pocket and the inner tray covers exposed ends of the hinge pin such that the lid is pivotably coupled to the lower housing.

19. The case of claim 1, wherein, in the fully open position, there is an interference between the lower housing and the lid that provides a mechanical hard stop to inhibit further movement of the lid relative to the lower housing.

20. The case of claim 1, wherein the lid comprises a lid body and an upper cover that covers an open end of the lid body and defines an upper cavity that is complimentary to an upper surface of the electronic device.

* * * * *